(12) United States Patent
Vadwa et al.

(10) Patent No.: US 12,080,147 B2
(45) Date of Patent: Sep. 3, 2024

(54) DETERMINING ALTERNATIVE OUTCOME OR EVENT BASED ON AGGREGATED DATA

(71) Applicant: Itron, Inc., Liberty Lake, WA (US)

(72) Inventors: Sahana Vadwa, Bangalore (IN); Adithya Krishna Murthy, Bangalore (IN); Gokulmuthu Narayanaswamy, Bangalore (IN); James Lee Kann, Mica, WA (US)

(73) Assignee: Itron, Inc., Liberty Lake, WA (US)

( * ) Notice: Subject to any disclaimer, the term of this patent is extended or adjusted under 35 U.S.C. 154(b) by 579 days.

(21) Appl. No.: 17/126,240

(22) Filed: Dec. 18, 2020

(65) Prior Publication Data

US 2022/0198911 A1    Jun. 23, 2022

(51) Int. Cl.
*E03B 7/00* (2006.01)
*E03B 7/02* (2006.01)
(Continued)

(52) U.S. Cl.
CPC .............. *G08B 23/00* (2013.01); *E03B 7/003* (2013.01); *E03B 7/02* (2013.01); *G01D 4/002* (2013.01);
(Continued)

(58) Field of Classification Search
CPC ........... E03B 7/003; E03B 7/02; G01D 4/002; G01M 3/00; G01M 3/16; G01M 3/28;
(Continued)

(56) References Cited

U.S. PATENT DOCUMENTS 7,458,387 B2   12/2008 McGill
7,759,948 B2    7/2010 Tischendorf et al.
(Continued)

FOREIGN PATENT DOCUMENTS

EP   1062645 B1   11/2002
EP   2477088 A1    7/2012
(Continued)

OTHER PUBLICATIONS

Lambrou, "A low cost sensor network for real time Monitoring and contamination detection in drinking water distribution systems" (Year: 2014).*
Fontanazza, "Contaminant Intrusion through leaks in water distribution system" (Year: 2015).*
Cloete, "Design of smart sensors for real-time water quality Monitoring" (Year: 2016).*

(Continued)

*Primary Examiner* — Mohamed Charioui
*Assistant Examiner* — Dacthang P Ngo
(74) *Attorney, Agent, or Firm* — Lee & Hayes, P.C.

(57) ABSTRACT

A data collection device and method for determining an alternative event condition is presented. The method includes receiving a first data communication including a first data value from a first sensor and determining a first event condition based on the first data value being beyond a predetermined threshold. The method further includes receiving additional data communications including additional data values from one or more second sensors, aggregating the first data value and the additional data values, and determining that the determination of the first event condition is incorrect based on the aggregated data values and a known relationship between the first sensor and the one or more second sensors. The method additionally includes determining a second event condition based on the first data value and the additional data values being beyond the predetermined threshold. An action may then be performed in response to the determination of the second event condition.

26 Claims, 22 Drawing Sheets

(51) Int. Cl.

| | |
|---|---|
| *G01D 4/00* | (2006.01) |
| *G01M 3/00* | (2006.01) |
| *G01M 3/16* | (2006.01) |
| *G01M 3/26* | (2006.01) |
| *G06Q 50/06* | (2024.01) |
| *G08B 23/00* | (2006.01) |

(52) U.S. Cl.
CPC ............... *G01M 3/00* (2013.01); *G01M 3/16* (2013.01); *G01M 3/26* (2013.01); *G06Q 50/06* (2013.01); *Y04S 10/30* (2013.01); *Y04S 10/52* (2013.01); *Y04S 20/30* (2013.01)

(58) Field of Classification Search
CPC ......... G06Q 50/06; G08B 23/00; Y04S 10/30; Y04S 10/52; Y04S 20/30
See application file for complete search history.

(56) References Cited

U.S. PATENT DOCUMENTS

| | | |
|---|---|---|
| 7,980,136 B2 | 7/2011 | Ben-Mansour |
| 8,054,199 B2 | 11/2011 | Addy |
| 9,928,720 B2 | 3/2018 | Cornwall |
| 9,939,341 B2 | 4/2018 | McNab et al. |
| 2010/0156632 A1 | 6/2010 | Hyland et al. |
| 2012/0111799 A1 | 5/2012 | Lemoine et al. |
| 2012/0112901 A1 | 5/2012 | Chasko |
| 2012/0174655 A1 | 7/2012 | Essich |
| 2014/0207392 A1 | 7/2014 | Cornwall |
| 2016/0001114 A1 | 1/2016 | Hyland et al. |
| 2016/0327603 A1 | 11/2016 | Sonderegger et al. |
| 2017/0303103 A1 | 10/2017 | Cullinan et al. |
| 2018/0101168 A1* | 4/2018 | Lv .................... G06Q 50/06 |
| 2018/0196399 A1 | 7/2018 | Rasekh et al. |
| 2018/0230681 A1 | 8/2018 | Poojary et al. |
| 2019/0025150 A1 | 1/2019 | Picardi et al. |
| 2019/0234786 A1 | 8/2019 | Klicpera |
| 2019/0323918 A1* | 10/2019 | Sahoo .................. G01M 3/22 |
| 2020/0072421 A1 | 3/2020 | Dietzen et al. |
| 2020/0173810 A1 | 6/2020 | Verma et al. |
| 2021/0110691 A1* | 4/2021 | Heinonen ............ G08B 29/188 |
| 2022/0195707 A1 | 6/2022 | Kann et al. |

FOREIGN PATENT DOCUMENTS

| | | |
|---|---|---|
| WO | 2011068273 A1 | 6/2011 |
| WO | 2018209238 A1 | 11/2018 |

OTHER PUBLICATIONS

International Search Report and Written Opinion for PCT Application No. PCT/US21/62914, mailed Mar. 17, 2022, 12 pages.
International Search Report and Written Opinion for PCT Application No. PCT/US21/62864, mailed Mar. 23, 2022, 12 pages.
"How Much Does an Industrial Water Treatment System Cost?", found at <https://www.samcotech.com/how-much-does-an-industrial-water-treatment-system-cost/>, SAMCO, dated Sep. 22, 2017, 4 pages.
"Energy Systems, Electricity, and Fire Safety," Course AP 312, University School of Planning and Architecture, Guru Gobind Singh Indraprastha University, Delhi, IN, published Jun. 13, 2015, found at <https://www.slideshare.net/supergirlanchal/energy-systems-electricity-and-fire-safety>, 41 pages.
"Backflow Prevention—What does it Mean to You?", American Backflow Prevention Association, found at <https://www.abpa.org/page/BackflowPrevention#>, date unknown, printed on Jan. 8, 2021, 2 pages.
"Remotely Control and Automatically Optimise Pressure in Your Entire Network," oNet, i20 Solutions, dated Feb. 20, 2018, 2 pages.
Manual of Design and Specification Standards, Div 16—Electrical, Section 16720—Fire Alarm Systems, University of Arizona, Mar. 2004, found at <https://pdc.arizona.edu/dssarchive/rev4/16720.pdf>, obtained from the Internet on Nov. 28, 2018, 3 pages.
Non-Final Office Action dated Jan. 29, 2020, for U.S. Appl. No. 16/206,121, 12 pages.
Notice of Allowance dated Jul. 2, 2020, for U.S. Appl. No. 16/206,121, 9 pages.
Notice of Allowance dated Nov. 3, 2020, for U.S. Appl. No. 16/206,121, 6 pages.
PCT International Search Report and Written Opinion dated Feb. 19, 2020, for PCT Application No. PCT/US2019/063002, 14 pages.
PCT International Search Report and Written Opinion dated Mar. 28, 2018, for PCT Application No. PCT/US2017/067827, 19 pages.
"Potential Contamination Due to Cross-Connections and Backflow and the Associated Health Risks," U.S. Environmental Protection Agency Office of Ground Water and Drinking Water Standards and Risk Management Division, Washington DC, Sep. 27, 2001, 44 pages.
Anwar, F., et al., "Network-Based Real-time Integrated Fire Detection and Alarm (FDA) System with Building Automation," 6th Intl. Conf. on Mechatronics, ICOM'17, IOP Conf. Series: Materials Science & Engineering, vol. 260, No. 012025, Aug. 8-9, 2017, Kuala Lumpur, Malaysia, at <http://iopscience.iop.org/article/10.1088/1757-899X/260/1/012025/meta>, 16 pages.
Artim , N., Emergency Management, "3.2 An Introduction to Fire Detection, Alarm, & Automatic Fire Sprinklers," Northeast Document Conservation Center, Nov. 28, 2018, at <https://www.nedcc.org/free-resources/preservation-leaflets/3.-emergency-management/3.2-an-introduction-to-fire-detection,-alarm,-and-automatic-fire-sprinklers>, 26 pages.
Dreher, A., et al., "*E. Coli* Found In Some Contaminated Hillyard Water This Weekend," The Spokesman-Review, Spokane, Washington, Jul. 31, 2019, at <https://www.spokesman.com/stories/2019/jul/31/e-coli-found-in-some-contaminated-hillyard-water-t/>, 6 pages.
"Automated Flushing Gives Water Savings," Elsevier Ltd., Nov. 6, 2019, at <https://www.filtsep.com/water-and-wastewater/features/automated-flushing-gives-water-savings/>, 3 pages.
Fontanazza, C., et al., "Contaminant intrusion through leaks in water distribution system: experimental analysis," Procedia Engineering , vol. 19 (2015), 13th Computer Control for Water Industry Conference, CCWI 2015, Sep. 2-4, 2015, Leicester, UK, pp. 426-433.
Hopf, Dr. S., "Application Models for the Power Distribution: High-rise Buildings", copyright 2012, Siemens Aktiengesellschaft, Berlin and Munich, Germany, found at <https://www.siemens.com/content/dam/webassetpool/mam/tag-siemens-com/smdb/energy-management/services-power-transmission-power-distribution-smart-grid/consulting/tip-planungshandb%C3%BCcher/application-model-for-high-rise-buildings.pdf>, printed from Internet on Nov. 28, 2018, 96 pages.
Kapis, J., et al., "Integration: Building Automation and Fire Alarms," Insights, Schneider Electric US, date unknown, found online at <https://www.schneider-electric.us/en/work/insights/integration-building-automation-and-fire-alarms.isp>, obtained from Internet on Nov. 28, 2018, 9 pages.
Mar, et al., "Integrating BAS, Electrical Systems," Insights, Schneider Electric UK, date unknown, found online at <https://www.schneider-electric.co.uk/en/work/insights/integrating-bas-electrical-systems.jsp>, obtained from Internet on Nov. 28, 2018, 9 pages.
Segura, J., "Use of Hydroinformatics Technologies for Real Time Water Quality Management and Operation of Distribution Networks, Case Study of Villavicencio, Colombia," Master of Science Thesis, Mar. 2006, UNESCO-IHE Institute for Water Education, Delft, The Netherlands, 112 pages.
White, R., "Liberty Lake Water Contamination Will Likely Require a Week of Boiling Drinking Water," The Spokesman-Review, Spokane, Washington, Nov. 22, 2019, at <https://www.spokesman.com/stories/2019/nov/21/liberty-lake-water-contamination-will-likely-requi/>, 3 pages.
1 Non-Final Office Action dated Feb. 23, 2021, for U.S. Appl. No. 16/454,625, 11 pages.

(56) References Cited

OTHER PUBLICATIONS

Office Action for U.S. Appl. No. 17/126,244, mailed on Aug. 14, 2023, Kann, "Determining Backflow Condition in Water Distribution System", 13 pages.

* cited by examiner

DETERMINING ALTERNATIVE OUTCOME OR EVENT BASED ON AGGREGATED DATA

FIELD OF THE DISCLOSURE

This disclosure relates generally to near real-time evaluation and response to data collected from networked sensors.

BACKGROUND

There are currently millions of sensors and endpoints in existing networked systems worldwide, such as internet-of-things (IoT) systems, telecommunications systems, advanced metering infrastructure (AMI) systems, and many other systems, which are already obtaining and reporting various data points related to their respective intended purposes. For example, such data points may include temperature readings, pressure measurement, movement, utility meter consumption readings (water, gas, electricity, etc.), water contamination determination, etc. While the individual data points collected by such sensors, etc., may mean something specific, relative to their intended purposes, there may be untapped potential in the data that they provide. The following disclosure explores some of those untapped possibilities by describing a system that can more effectively use information from an existing infrastructure to determine alternative outcomes or events.

Figure 1:
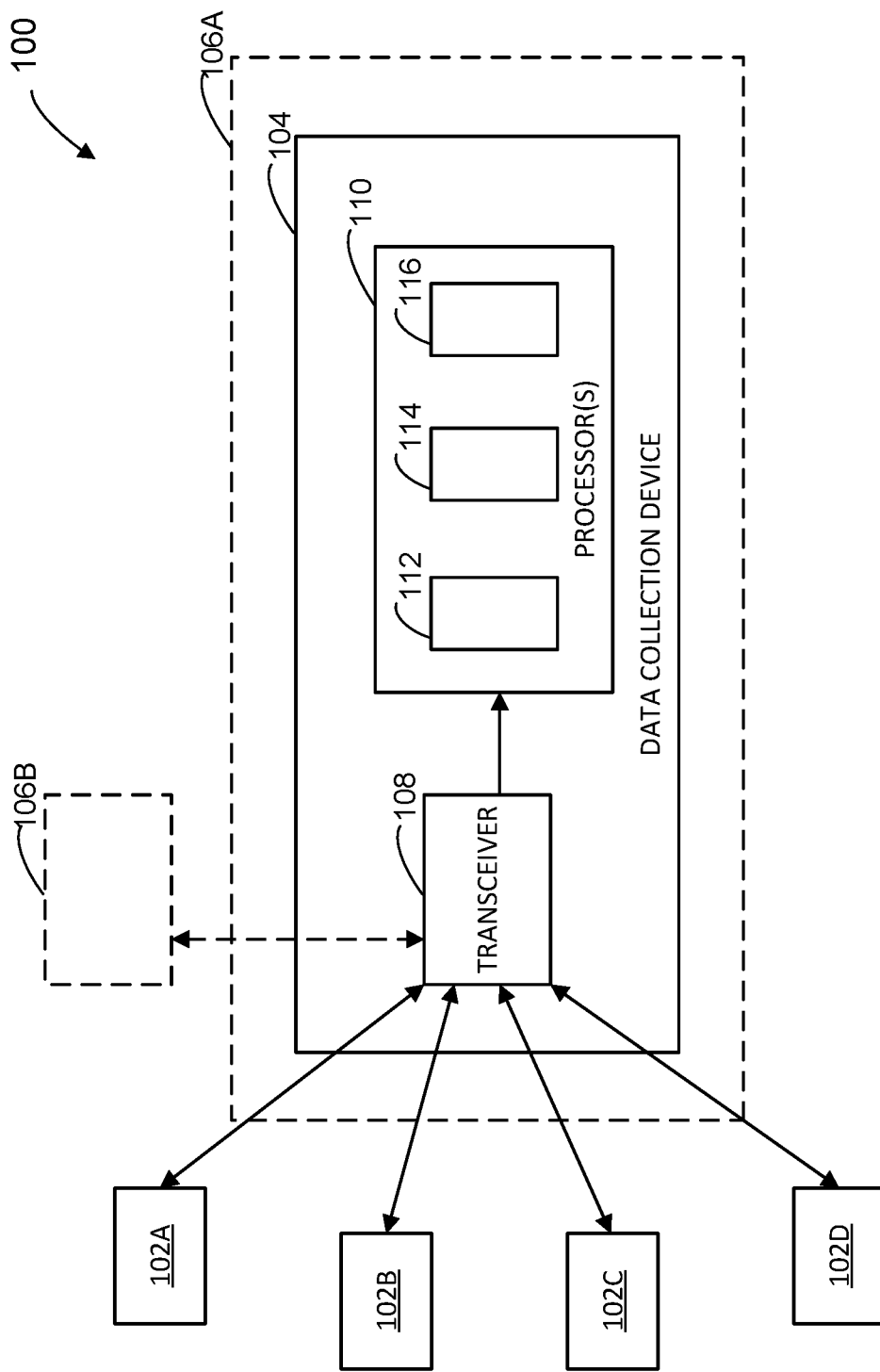
FIG. 1 is a block diagram showing communication from node devices to/from a data collection device, according to embodiments of the present disclosure.

In the drawings, the leftmost digit(s) of a reference number may identify the drawing in which the reference number first appears.

DETAILED DESCRIPTION

Individual data points coming from sensors, endpoints, etc., in existing communication infrastructures (IoT, AMI, etc.) may be used in conjunction with other observed data within the same infrastructure, and/or from different infrastructures, to determine alternative outcomes or events that the individual data alone may not convey. In some examples, individual data points, that alone may provide unremarkable information, when observed in conjunction with other data may pinpoint a location of a system event (e.g., a defect such as a leak or contamination point, or foresight of an impending leak or contamination), may identify a potentially dangerous or catastrophic event (e.g., a fire, a flood, an earthquake, etc.), or may provide other useful information that may be used to determine an alternative outcome or event. Providing this alternative outcome determination capability may not only provide further information but may also provide the opportunity for a more timely and effective response. For example, a response may include closing valves (e.g., in gas or water systems), shutting down services/systems (e.g., gas, electricity, water services) to individual consumers or groups of consumers, even alerting emergency services (e.g., 911 or other services) and/or affected persons/businesses, providing a public safety element that may not otherwise exist or may not be as timely.

The description herein discloses a system of determining alternative outcomes or events using aggregated data from a plurality of networked nodes in an effective and timely manner. By aggregating and analyzing such data, more meaningful and distinctive conclusions may be drawn than by analyzing each individual piece of data or data collected from a single node device. Because the collection of data may already be available in existing infrastructure(s), this additional capability greatly increases the usefulness and effectiveness of such data while being cost-effective.

Embodiments are now described with reference to the figures, where like reference numbers may indicate identical or functionally similar elements. While specific configurations and arrangements are discussed, it should be understood that this is done for illustrative purposes only. A person skilled in the relevant art will recognize that other configurations and arrangements can be used without departing from the spirit and scope of the description. It will be apparent to a person skilled in the relevant art that the technology disclosed herein can also be employed in a variety of other systems and applications other than what is described herein.

FIG. 1 is a block diagram showing an example 100 of communication from node devices 102A-102D (collectively, 102) to a data collection device 104, according to embodiments of the present disclosure. Node devices 102 may include IoT devices or other devices (e.g., utility metering devices) having one or more sensors and/or measurement devices that take readings and/or measurements that the node device 102 may send to data collection device 104. While only four node devices (102A-102D) are shown, any number of node devices 102 may exist. Data collection device 104 may receive data transmissions from one or more node devices 102 and may analyze data received in the data transmissions, make determinations based on the data, and/or take one or more actions based on the determinations. In embodiments, data collection device 104 may be located within a central office 106A (e.g., a central office of a service provider associated with node devices 102), or may be a mobile data collection device managed by, and in communication with, a computing device at a central office 106B (shown as an optional alternative via dashed arrow). In an embodiment, data collection device 104 may itself be a node 102, such as an edge device/node or any networked node that communicates and/or shares data with other nodes 102, in a centralized or decentralized fashion (e.g., peer-to-peer), as would be understood by one of ordinary skill in the relevant arts. In a decentralized implementation (e.g., that may use distributed intelligence), a node 102 acting as a data collection device 104 may provide any or all of the data collection, aggregation, analysis, determination, and/or action-taking activities. For the analysis, determination, and action-taking activities, data collection device 102/104 may have and use knowledge of the applicable service topology involved. If data collection device 104 is not located within a central office 106A, data collection device 104 may send data and/or other information to a computing device at a central office (e.g., central office 106B).

Data collection device 104 may include, among other components/modules, a transceiver 108 used to send and receive communications to/from one or more of nodes 102 and, in some embodiments, to/from a computing device at a central office 106B. Data collection device 104 may also include one or more processors 110, which may include, for example, a data aggregator 112, an analyzer 114, and/or an action module 116. Data aggregator 112 may aggregate data received from nodes 102. Analyzer 114 may analyze the individual and/or aggregated data received from nodes 102. Action module 116 may provide reporting based on analyzed data and/or may take one or more action(s) based on the analyzed data. An example networking environment as well as example platforms of data collection device 104 and nodes 102 are discussed in more detail below with reference to FIGS. 19-21.

Figure 2:
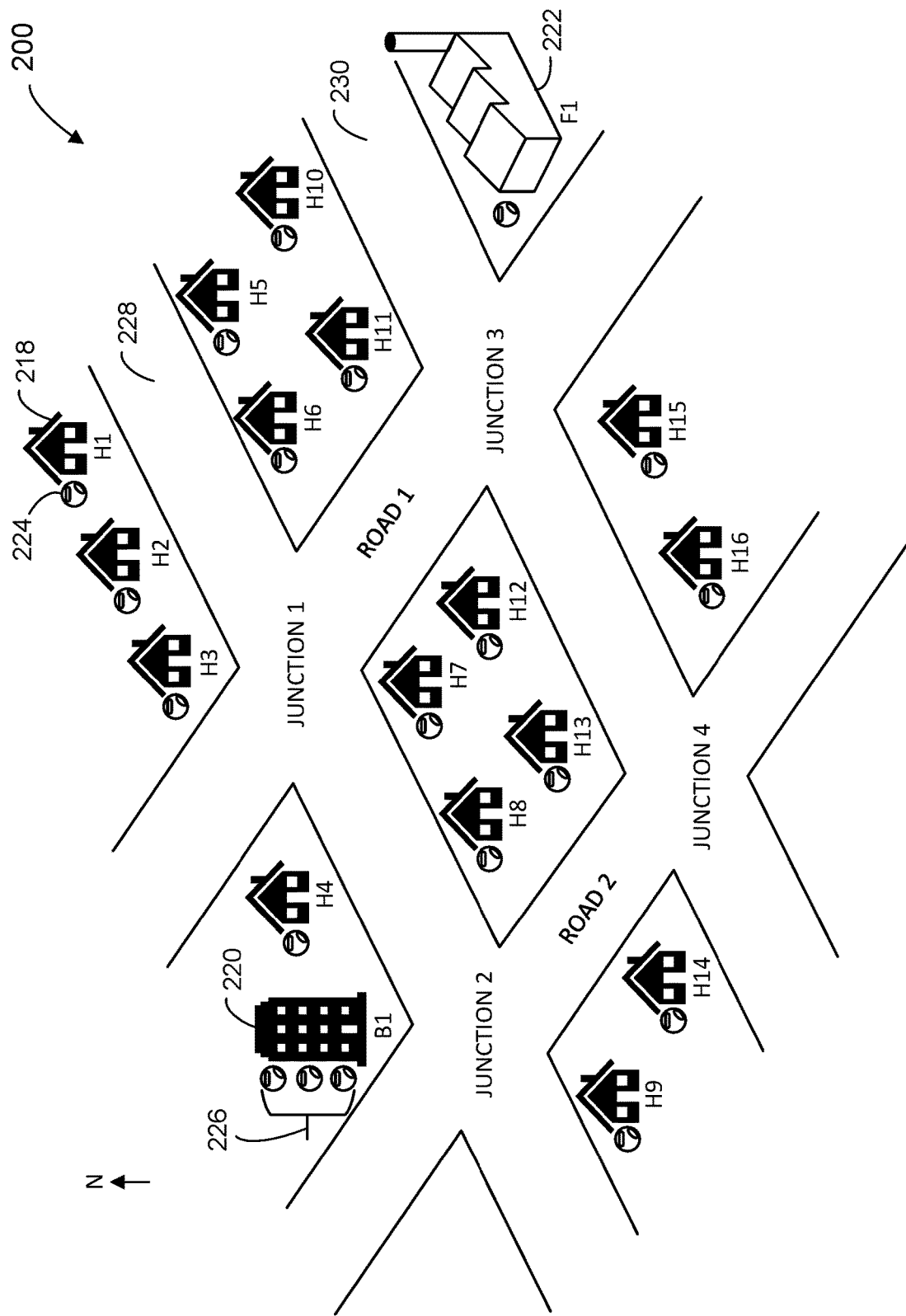
FIG. 2 illustrates an example neighborhood including homes, an office building or hotel, and a factory having associated network nodes that may be utilized in communication system(s) and method(s) such as those described herein, according to embodiments of the present disclosure.

FIG. 2 illustrates an example neighborhood 200 including homes H1-H16 (e.g., home 218), an office building or hotel B1 (e.g., building 220), and a factory F1 (e.g. factory 222) having associated network nodes (e.g., node 224 for home 218 and nodes 226 for building 220) that may be utilized in communication system(s) and method(s) such as those described herein, according to embodiments of the present disclosure. Example neighborhood 200 includes roadways (e.g., roads 228 and 230), along which homes H1-H16, building B1, and factory F1 are located. Roadways 228 and 230 include junctions 1-4 at intersections with other roadways (e.g., road 1 and road 2). Homes H1-H16, building B1, and factory F1 each include at least one network node (e.g., node(s) 224/226). For purposes of providing an example, neighborhood 200 includes utility meters as network nodes (e.g., node(s) 224/226). However, other types of network nodes, including those unrelated to utilities, may also be present/used. In example neighborhood 200, a single utility meter is shown at most of the structures for simplicity of discussion, though more than one utility meter, and/or utility meters of different types (e.g., gas, water, and/or electricity) may be present. For building 220 (B1), three utility meters 226 are shown. For a larger building, or one with differing occupants/tenants, etc., it is typical for more than one utility meter (even of the same type) to be present. For example, if building 220 was an apartment building, there may be separate utility meters (e.g., separate gas meters, separate water meters, and/or separate electricity meters) for each apartment/unit. Factory 222 (F1), which would likely be a large structure, would likely also have more than one utility meter (and also likely have multiple types of meters), though only one is shown for simplicity of discussion.

FIGS. 3-9 illustrate the example neighborhood of FIG. 2, where various event situations may be determined using the communication system(s) and method(s) described herein, according to embodiments of the present disclosure.

Figure 3:
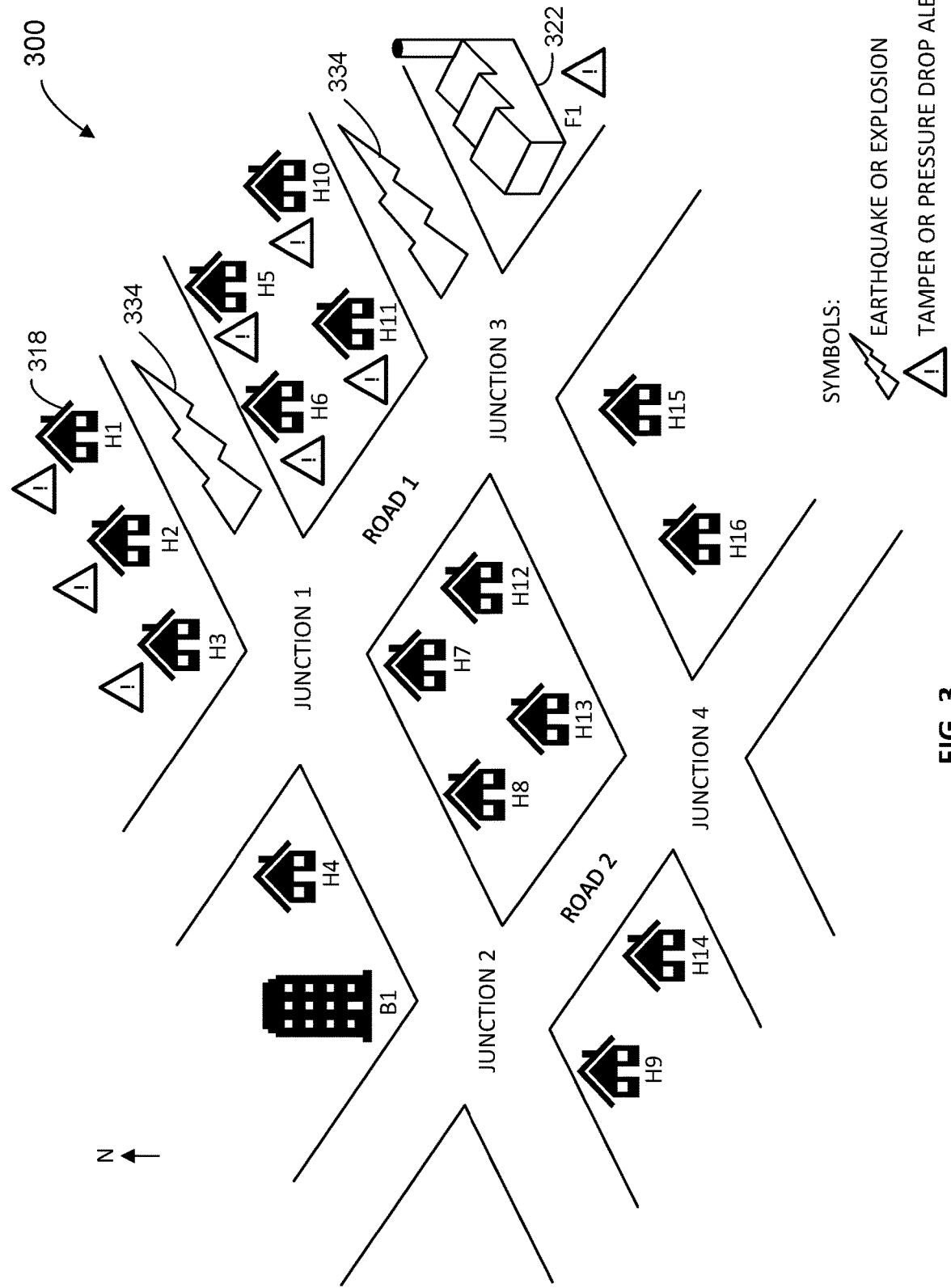
FIGS. 3-9 illustrate the example neighborhood of FIG. 2, where various event situations may be determined using the communication system(s) and method(s) described herein, according to embodiments of the present disclosure.

FIG. 3 illustrates an example 300 involving an earthquake, explosion, volcanic eruption, plane crash, or other event that may, for example, make the ground strongly shake (or otherwise may cause movement, such as a very strong wind or tornado). In the example shown, if such an event occurs and is felt or experienced around areas 334, one or more sensors/nodes at home 318 (H1), neighboring homes (e.g., H2, H3, H5, H6, H10, H11), and/or factory 322 (F1) may send alerts or alarms, or may otherwise report abnormalities to each other, neighboring nodes, a data collection device 104, and/or a central office 106A/106B. For example, some node devices (e.g., electricity meters) may include sensors such as accelerometers, gyroscopes, or similar motion detection sensors that are used to detect removal of the device (e.g., electricity meter theft). An abnormality reported from such a sensor from any single node would indicate (via analyzer 114, for example) removal or theft of the associated device (in this case, a single electricity meter). However, if this type of abnormality is reported from two or more devices (e.g., from devices associated with H1, H2, H3, H5, H6, H10, H11, and/or F1) with a known or determined relationship (e.g., within a predetermined proximity of each other or along the same service line, etc.) and/or within a predetermined small timeframe (e.g., within minutes, seconds, or simultaneously), the aggregation of this data (via data aggregator 112, for example) as analyzed (via analyzer 114) will instead indicate a much larger (or more extensive) and very different or alternative event, such as an earthquake or explosion, that caused movement (e.g., momentary shaking or rattling) of the sensors.

Similarly, some node devices (e.g., water meters and/or gas meters) may include leakage or pressure sensors that may detect leakage or a pressure drop at the device or in the supply line leading to the device. An abnormality reported from such a sensor from any single node may indicate (via analyzer 114, for example) a water or gas leak at the associated device (in this case, a single gas or water meter) or along the supply line leading to the device. However, if this type of abnormality is reported from two or more such devices (e.g., from devices associated with H1, H2, H3, H5, H6, H10, H11, and/or F1) with a known or determined relationship (e.g., within a predetermined proximity of each other and/or along the same service line, etc.) and/or within a predetermined small timeframe (e.g., within minutes, seconds, or simultaneously), the aggregation of this data (via data aggregator 112, for example) as analyzed (via analyzer 114) could instead indicate damage to a main supply line leading to those nodes, or may indicate a more catastrophic event such as an earthquake or explosion that caused damage to water or gas pipelines or the meters themselves.

In yet another example, such abnormalities reported from a combination of sensor types may provide further indication, and/or a higher degree of confidence, that an alternative event (e.g., earthquake, explosion, etc.) has occurred. For example, if home 318 (H1) has one or more meters (e.g., electricity, gas, and/or water meters), and the meter(s) included some combination of movement-related sensors (e.g., accelerometer, gyroscope, global positioning sensor (GPS), etc.) and/or pressure or leakage sensors, and at least one movement-related sensor and at least one pressure/leakage sensor were reporting abnormalities, aggregator 112 may aggregate that data, which, when analyzed by analyzer 114 may be found to indicate a geological event or explosion near or at home 318 (H1). If sensors (or combinations of sensors of these differing types) from other locations (e.g., from H2, H3, H5, H6, H10, H11, and/or F1) were also reporting similar abnormalities, analyzer 114 may determine the alternative event with an even higher confidence level. On the other hand, if leakage or pressure sensors are indicating a possible gas or water leak, but other types of sensors (such as tamper-related sensors or temperature sensors) are not reporting abnormalities, a determination of a leak along a pipeline (as opposed to an explosion or earthquake) could be made with a higher degree of confidence. In other words, abnormality reporting, or lack thereof, from differing sensor types may present differentiating factors in the determination of an occurrence of an alternative event.

In all of the examples provided above with regard to FIG. 3, in addition to determining the occurrence of an alternative event, analyzer 114 may determine, from the aggregated data and other information (e.g., locations and/or relationships of the sensors/nodes reporting abnormalities), the extent of the alternative event (e.g., affected area (e.g., "three square blocks NE of Road 1")), intensity levels of the event at various locations within the affected area (e.g., if some reported sensor readings were higher than others, etc.), etc.). Once these determinations are made, this information may be reported via action module 116. For example, an alternative event and any associated collected or determined information may be reported to a central office 106A/106B and/or may be reported elsewhere by data collection device 104 or central office 106A/106B (e.g., to homeowners and/or businesses in the affected and/or immediate surrounding areas (e.g., via phone, text, alert to a monitoring application (e.g., on a smartphone or similar device), alert to an in-home/office monitoring system, etc.), to emergency services (e.g., 911 or other services) (which can then alert others in the general area as they see fit), etc.). In addition, action module 116 may provide other actions, such as, if the nodes are utility nodes, sending signals to turn off affected nodes (to protect the node devices) and/or to shut off gas/water/electricity supplied to the sites (e.g., affected homes or businesses), or along their service lines (e.g., at valves, transformers, etc.), if leaving them on would be dangerous or a matter of public safety, for example. In some embodiments, perhaps depending on the situation, a consumer (e.g., homeowner, business, etc.) may have the ability to override such shut-off/shut-down actions.

Figure 4:
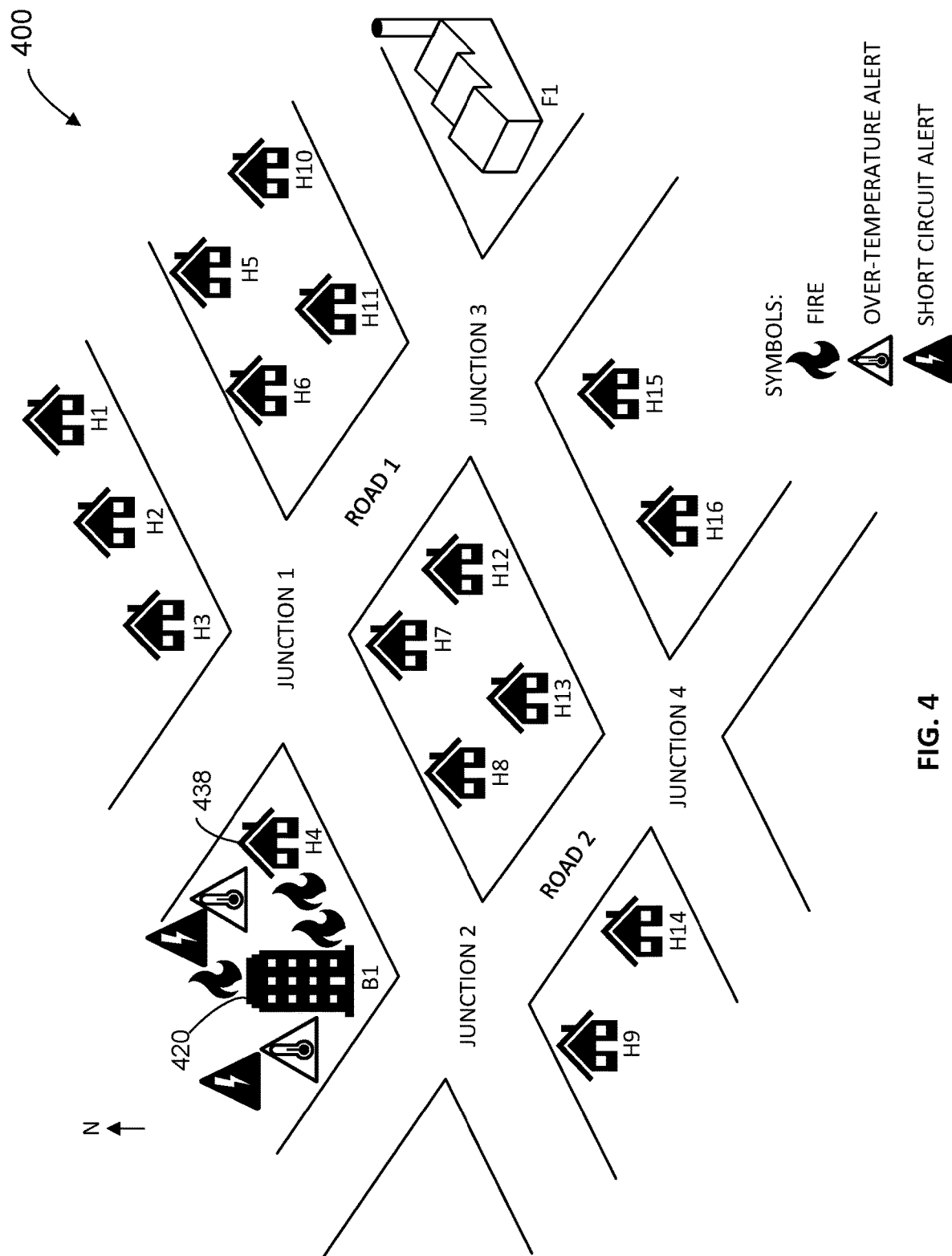

FIG. 4 illustrates an example 400 involving a fire. In the example shown, if fire occurs and is felt or experienced around home 438 (H4) and/or building 420 (B1), one or more sensors/nodes at home 438 (H4) and/or building 420 (B1) may send alerts or alarms, or may otherwise report abnormalities to each other, neighboring nodes, a data collection device 104, and/or a central office 106A/106B. For example, some node devices (e.g., electricity meters and/or gas meters) may include temperature sensors that detect high temperatures at the device (e.g., an over-temperature reading that surpasses a predetermined threshold temperature). An abnormality reported from such a sensor from any single node (such as a node at home 438 (H4)) would indicate (via analyzer 114, for example) an overheating of a component at that node device (in this case, for example, a single electricity or gas meter). However, if this type of abnormality is reported from two or more devices (e.g., an electricity meter and gas meter at one site) or from two or more sites (e.g., one or more node devices (e.g., meter(s)) at home 438 (H4) and one or more node devices (e.g., meter(s)) at building 420 (B1)) with a known or determined relationship (e.g., within a predetermined proximity of each other or along the same service line, etc.) and/or within a predetermined small timeframe (e.g., within minutes, seconds, or simultaneously), the aggregation of this data (via data aggregator 112, for example) as analyzed (via analyzer 114) would instead indicate a much larger (or more extensive) and very different or alternative event, such as a fire.

Similarly, some node devices (e.g., electricity meters, gas meters, and/or water meters) may include sensors that may detect a short circuit at the device. An abnormality reported from such a sensor from any single node may indicate (via analyzer 114, for example) a short circuit at the associated device (which, for example, may be caused by a faulty component or faulty wiring at the device). However, if this type of abnormality is reported from two or more such devices (e.g., from devices associated with home 438 (H4) and/or building 420 (B1)) with a known or determined relationship (e.g., within a predetermined proximity of each other and/or along the same service line, etc.) and/or within a predetermined small timeframe (e.g., within minutes, seconds, or simultaneously), the aggregation of this data (via data aggregator 112, for example) as analyzed (via analyzer 114) could instead indicate a fire. A fire can cause the insulation around conductors to break down and cause such short circuits.

In yet another example, such abnormalities reported from a combination of sensor types may provide further indication, and/or a higher degree of confidence, that an alternative event (in this example, a fire) has occurred. For example, if home 438 (H4) has one or more meters (e.g., electricity, gas, and/or water meters), and the meter(s) included some combination of temperature sensors and short circuit sensors, and at least one temperature sensor and at least one short circuit sensor were reporting abnormalities, aggregator 112 may aggregate that data, which, when analyzed by analyzer 114 may be found to indicate a fire at home 438 (H4). If sensors (or combinations of sensors of these differing types) from other locations (e.g., building 420 (B1)) were also reporting similar abnormalities, analyzer 114 may determine the alternative event with an even higher confidence level.

Similar to the example shown in FIG. 3, in all of the examples provided above with regard to FIG. 4, in addition to determining the occurrence of an alternative event, analyzer 114 may determine, from the aggregated data and other information (e.g., locations and/or relationships of the sensors/nodes reporting abnormalities), the extent of the alternative event (e.g., affected area (e.g., "the block just north of junction 2")), intensity levels of the event at various locations within the affected area (e.g., if some reported sensor readings were higher than others, etc.), etc. Once these determinations are made, this information may be reported via action module 116. For example, an alternative event and any associated collected or determined information may be reported to a central office 106A/106B and/or may be reported elsewhere by data collection device 104 or central office 106A/106B (e.g., to homeowners and/or businesses in the affected and/or immediate surrounding areas (e.g., via phone, text, alert to a monitoring application (e.g., on a smartphone or similar device), alert to an in-home/office monitoring system, etc.), to emergency services (e.g., 911 or other services) (which can then alert others in the general area as they see fit), etc.). In addition, action module 116 may provide other actions, such as, if the nodes are utility nodes, sending signals to turn off affected nodes (to protect the node devices) and/or to shut off gas/water/electricity supplied to the sites (e.g., affected homes or businesses), or along their service lines (e.g., at valves, transformers, etc.), if leaving them on would be dangerous or a matter of public safety, for example. In some embodiments, perhaps depending on the situation, a consumer (e.g., homeowner, business, etc.) may have the ability to override such shut-off/shut-down actions.

Figure 5:
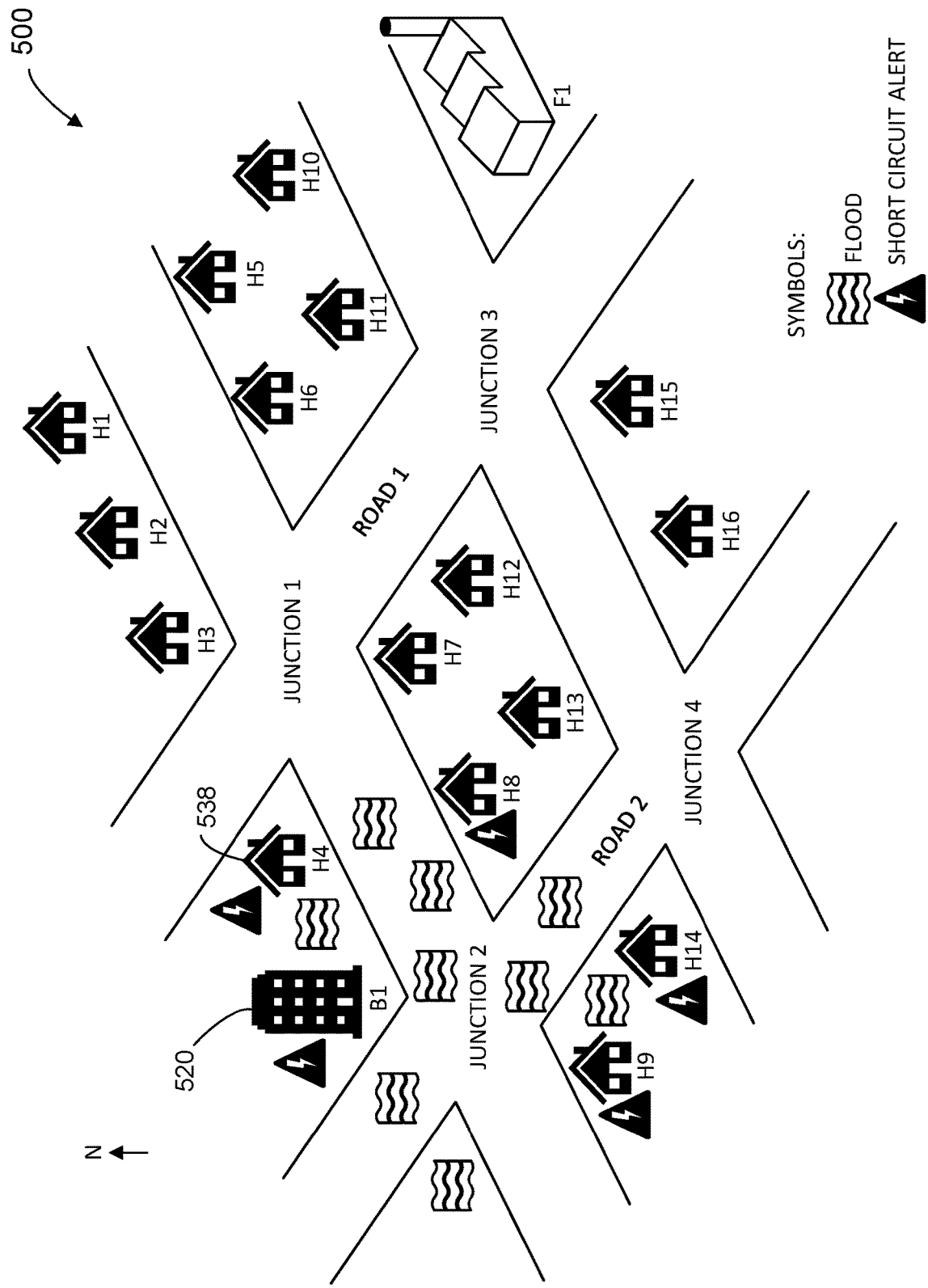

FIG. 5 illustrates an example 500 involving a flood. In the example shown, if a flood occurs and is experienced around home 538 (H4) and nearby homes (e.g., H8, H9, H14), and/or building 520 (B1), one or more sensors/nodes at one or more homes (e.g., H4, H8, H9, H14) and/or building 520 (B1) may send alerts or alarms, or may otherwise report abnormalities to each other, neighboring nodes, a data collection device 104, and/or a central office 106A/106B. For example, some node devices (e.g., utility meters, such as electricity meters, gas meters, or water meters) may include sensors that may detect a short circuit at the device. An abnormality reported from such a sensor from any single node may indicate (via analyzer 114, for example) a short circuit at the associated device (which, for example, may be caused by a faulty component or faulty wiring at the device). However, if this type of abnormality is reported from two or more such devices (e.g., from devices associated with home 538 (H4), homes H8, H9, H14, and/or building 520 (B1)) with a known or determined relationship (e.g., within a predetermined proximity of each other and/or along the same service line, etc.) and/or within a predetermined small timeframe (e.g., within minutes, seconds, or simultaneously), the aggregation of this data (via data aggregator 112, for example) as analyzed (via analyzer 114) could instead indicate a flood. While in the previous example (shown in FIG. 4) short circuit alerts in conjunction with over-temperature alerts may indicate a fire, short circuit alerts with the absence of over-temperature alerts, tamper alerts, or other alerts, would indicate a flood rather than another type of event, such as a fire.

Similar to the examples shown in FIGS. 3 and 4, in all of the examples provided above with regard to FIG. 5, in addition to determining the occurrence of an alternative event, analyzer 114 may determine, from the aggregated data and other information (e.g., locations and/or relationships of the nodes reporting abnormalities), the extent of the alternative event (e.g., affected area (e.g., "the vicinity of junction 2")), intensity levels of the event at various locations within the affected area (e.g., if short circuits were reported from nodes at a higher altitude than others (e.g., if meters at building 520 were stacked, and higher stacked meters were reporting short circuits, etc.), then approximate depth of a flood may be determined or estimated), etc. Once these determinations are made, this information may be reported via action module 116. For example, an alternative event and any associated collected or determined information may be reported to a central office 106A/106B and/or may be reported elsewhere by data collection device 104 or central office 106A/106B (e.g., to homeowners and/or businesses in the affected and/or immediate surrounding areas (e.g., via phone, text, alert to a monitoring application (e.g., on a smartphone or similar device), alert to an in-home/office monitoring system, etc.), to emergency services (e.g., 911 or other services) (which can then alert others in the general area as they see fit), etc.). In addition, action module 116 may provide other actions, such as, if the nodes are utility nodes, sending signals to turn off affected nodes (to protect the node devices) and/or to shut off gas/water/electricity supplied to the sites (e.g., affected homes or businesses), or along their service lines (e.g., at valves, transformers, etc.), if leaving them on would be dangerous or a matter of public safety, for example. In some embodiments, perhaps depending on the situation, a consumer (e.g., homeowner, business, etc.) may have the ability to override such shut-off/shut-down actions.

Figure 6:
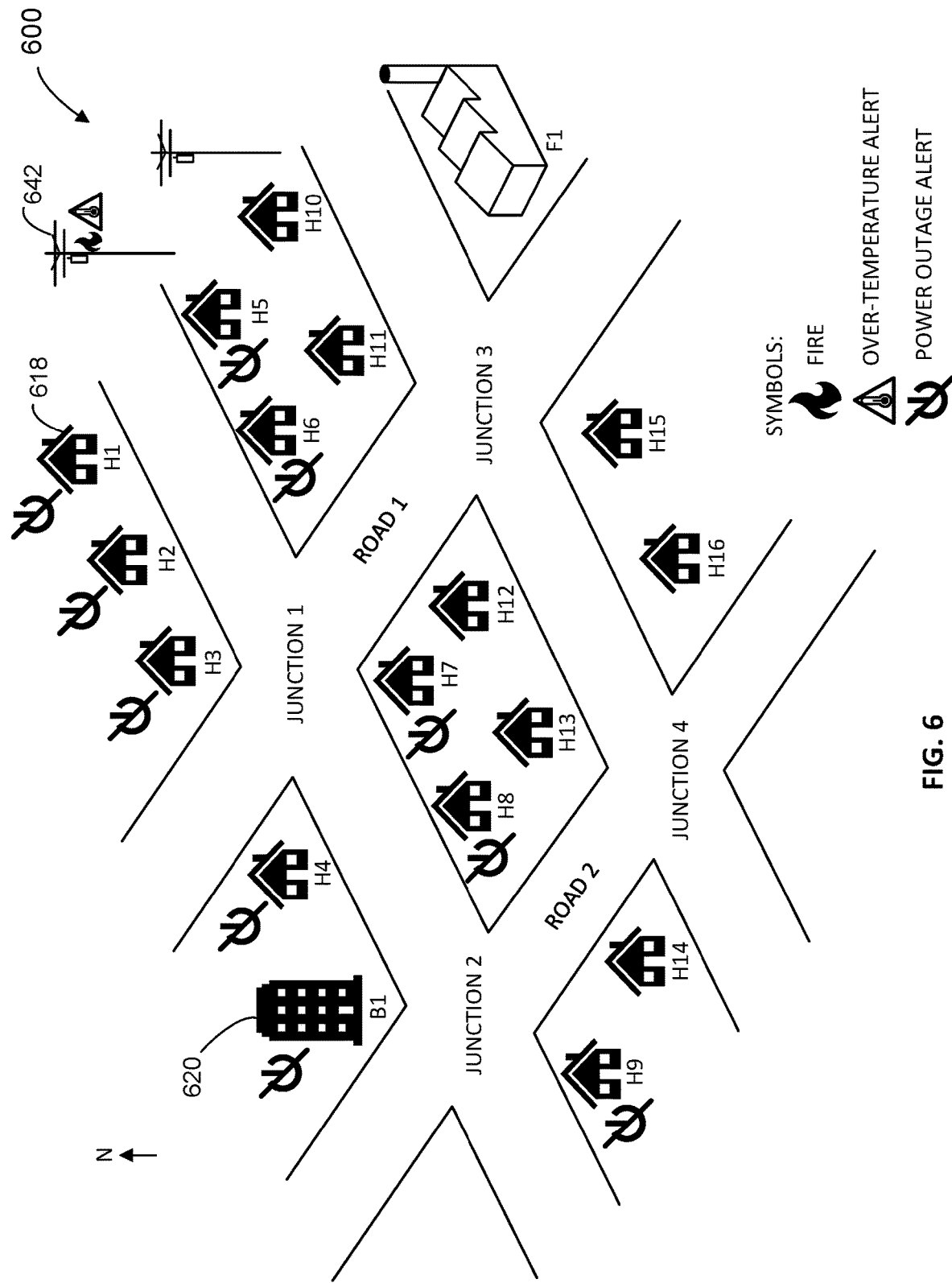

FIG. 6 illustrates an example 600 involving a power outage and possible transformer failure. In the example shown, if a power outage occurs and is experienced at home 618 (H1), other homes (e.g., H2-H9), and/or building 620 (B1), one or more sensors/nodes at homes H1-H9 and/or building 420 (B1) may send alerts or alarms, or may otherwise report abnormalities to each other, neighboring nodes, a data collection device 104, and/or a central office 106A/106B. For example, some node devices (e.g., electricity meters) may include power outage sensors that can detect loss of power at the device. An abnormality reported from such a sensor from any single node (such as a node at home 618 (H1)) would indicate (via analyzer 114, for example) a loss of power at that node device (in this case, for example, a single electricity meter), which may indicate a localized power loss or malfunctioning node or sensor. However, if this type of abnormality is reported from two or more devices (e.g., more than one node device at one site) or from two or more sites (e.g., one or more node devices (e.g., electricity meter(s)) at home 618 (H1) and one or more node devices (e.g., meter(s)) at homes H2-H9 and/or building 620 (B1)) with a known or determined relationship (e.g., within a predetermined proximity of each other or along the same service line, etc.) and/or within a predetermined small timeframe (e.g., within minutes, seconds, or simultaneously), the aggregation of this data (via data aggregator 112, for example) as analyzed (via analyzer 114) would instead indicate a much larger (or more extensive) alternative event, such as a more widespread power outage or problem with a transformer or substation that services those sites (e.g., a transformer fire at transformer 642).

Some node devices (e.g., a meter or other device/sensor) placed at a transformer, such as transformer 642, may include one or more temperature sensors that detect high temperatures (e.g., an over-temperature reading that surpasses a predetermined threshold temperature) at or near the transformer. An abnormality reported from such a sensor from any single node at a transformer (such as transformer 642) would indicate (via analyzer 114, for example) an overheating of a component at that node device/transformer. However, if this type of abnormality is reported from a node at transformer 642, and additionally, any of the nodes at homes H1-H9 and/or from building 620 (B1) with a known or determined relationship (e.g., within a predetermined proximity of each other and/or along the same service line (e.g., served by transformer 642), etc.) and/or within a predetermined small timeframe (e.g., within minutes, seconds, or simultaneously) are reporting power outages, the aggregation of this data (via data aggregator 112, for example) as analyzed (via analyzer 114) could instead indicate a fire or other problem with transformer 642 that caused the reported power outage(s). While the reported power outages at various sites, alone, may indicate a problem with an associated transformer, an additional over-temperature alert from a node of the transformer provides an even higher confidence that there is a problem, such as a fire, with the transformer.

Further, the transformer may include a distribution transformer meter (DTM). A DTM may assist in managing electricity distribution to a subset of consumer sites (e.g., homes, businesses, etc.). If individual readings from the sites add up to more consumption than the associated DTM reports, this may indicate electricity theft, etc., at one of the sites. Information reported from a DTM may also be utilized to determine if a problem with a transformer is in the primary winding(s) (on the utility side) or secondary winding(s) (on the consumer side) of the transformer. For example, temperature sensors associated with the windings may be used for this determination. A high temperature reading at one winding and not at the other (or a higher relative temperature reading at one winding versus at the other winding) may indicate a problem with the associated winding with the high temperature reading. As those of ordinary skill in the relevant art would recognize, secondary windings are typically thinner and may be prone to burning out. In yet another example, one or more temperature sensors in the DTM may indicate other information about the nature of a transformer problem. For instance, if one or more temperature sensors on the DTM indicate an over-temperature condition, but unlike the example above no other alerts are reported, this may indicate a problem with the transformer's fan or cooling mechanism, or may indicate a fire, which, when reported, may be attended to before a power outage occurs.

Similar to the examples shown in FIGS. 3-5, in all of the examples provided above with regard to FIG. 6, in addition to determining the occurrence of an alternative event, analyzer 114 may determine, from the aggregated data and other information (e.g., locations and/or relationships of the sensors/nodes reporting abnormalities), the extent of the alternative event (e.g., affected area (e.g., "sites served by transformer 642")), etc. Once these determinations are made, this information may be reported via action module 116. For example, an alternative event and any associated collected or determined information may be reported to a central office 106A/106B and/or may be reported elsewhere by data collection device 104 or central office 106A/106B (e.g., to homeowners and/or businesses in the affected and/or immediate surrounding areas (e.g., via phone, text, alert to a monitoring application (e.g., on a smartphone or similar device), alert to an in-home/office monitoring system, etc.), to emergency services (e.g., 911 or other services) (which can then alert others in the general area as they see fit), etc.). In addition, action module 116 may provide other actions, such as, if the nodes are utility nodes, sending signals to turn off affected nodes (to protect the node devices) and/or to shut off gas/water/electricity supplied to the sites (e.g., affected homes or businesses), or along their service lines (e.g., at valves, transformers, etc.), if leaving them on would be dangerous or a matter of public safety, for example. In some embodiments, perhaps depending on the situation, a consumer (e.g., homeowner, business, etc.) may have the ability to override such shut-off/shut-down actions.

Figure 7:
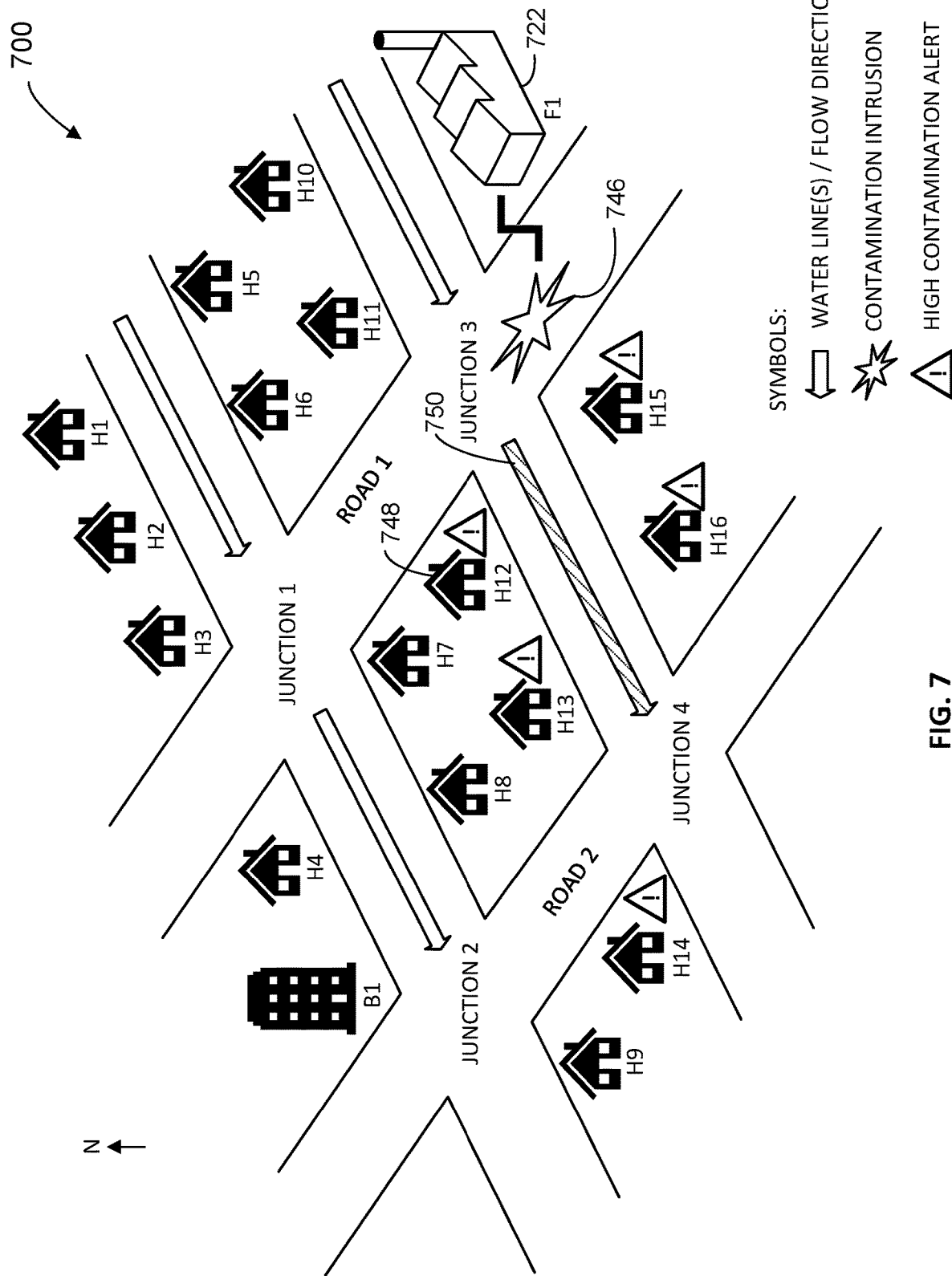
Figure 8:
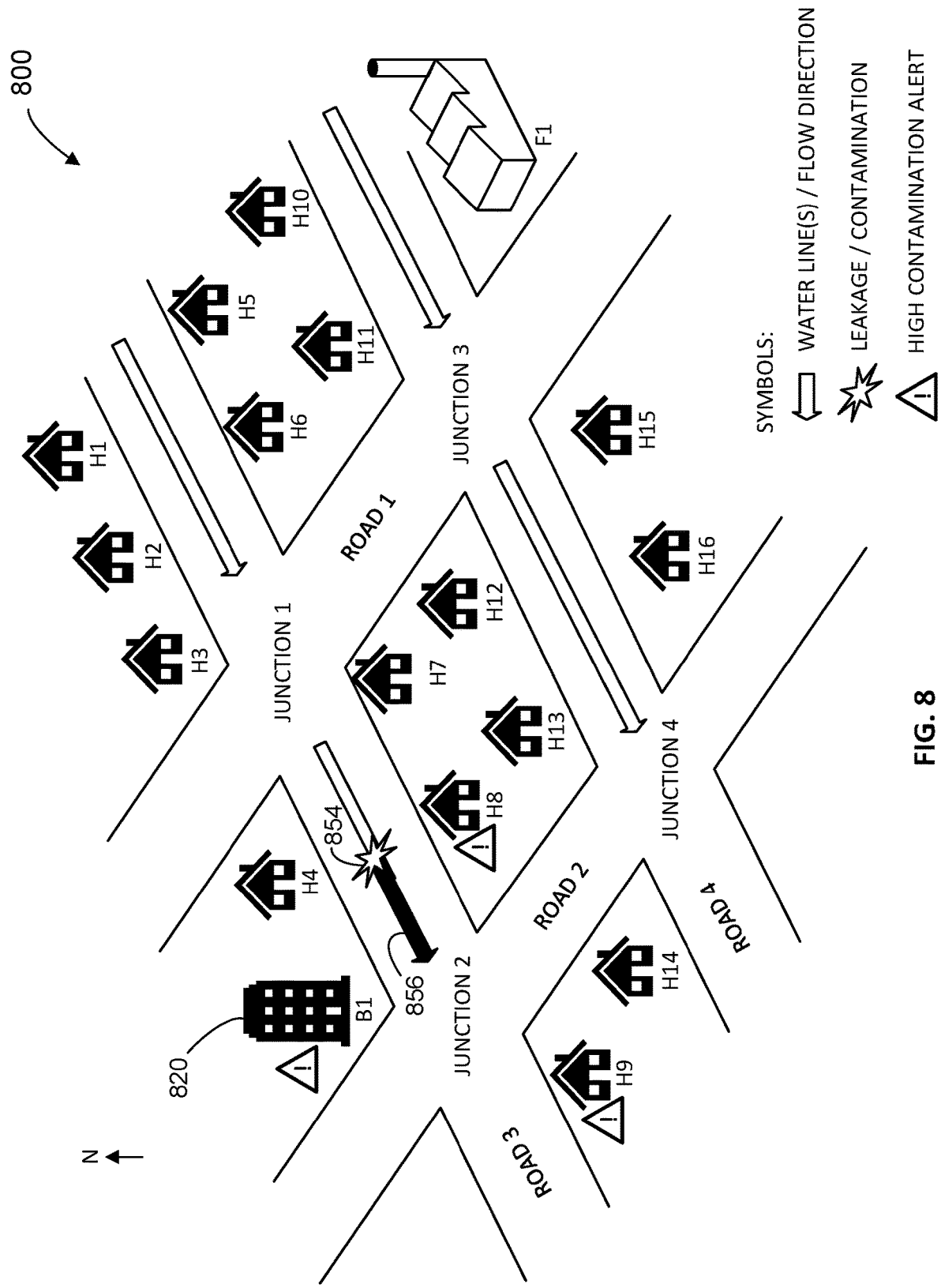
Figure 9:
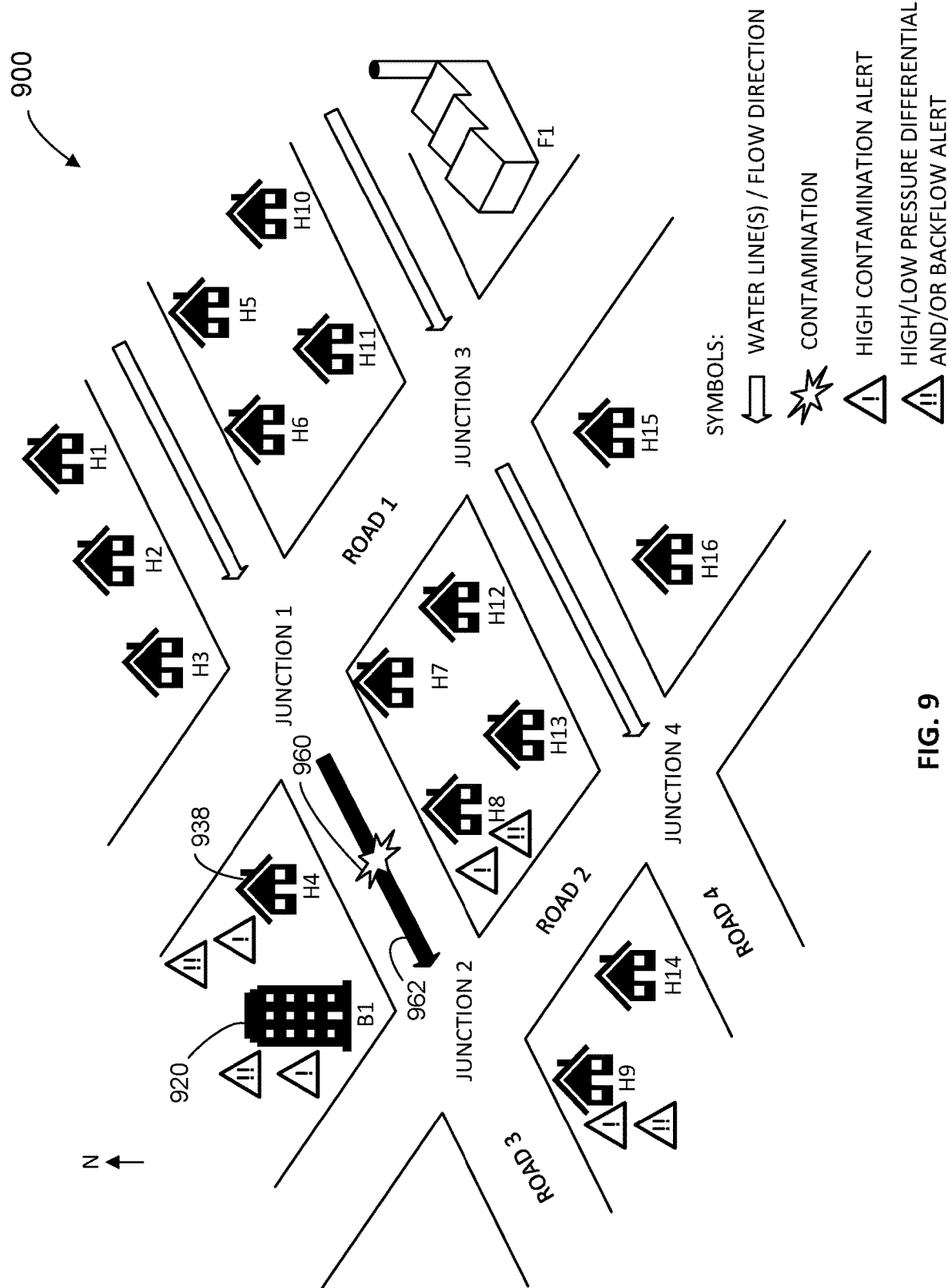

FIGS. 7-9 illustrate examples involving contamination in a water supply line. Water is a critical resource supplied to homes and business by water utility companies and/or municipalities. Any contamination in a water supply system may lead to a chain reaction of undesired consequences. Water supplies may exceed the prescribed maximum contamination level for total dissolved solids (TDS). If TDS levels and possibly other contaminant levels exceed the prescribed maximum(s), such contaminated water may be deemed unfit for human consumption/use. While conventional water purifiers help to make water potable, there are other reasons why regular automated monitoring of TDS and other contamination levels is important. For example, high TDS levels may result in scale buildup (e.g., in cylinders, pipes, valves, etc.), which may slow down performance of industrial processes (e.g., involving boilers, food processers, cooling towers, etc.). Aquariums may need a constant TDS level check in place in order to maintain a consistent level of TDS as may be found in the aquatic organisms' original habitats. Hydroponics, aquaponics, aeroponics, etc., may need to monitor nutrient and TDS concentration in their water solvent. In addition, maintenance costs for pools, car washes, etc., may significantly increase if TDS contamination levels are not kept in check. In general, a high level of TDS (or any other) contamination in any water supply is a sign of potential concern and may call for further inspection and/or regulation. High levels of TDS may be caused by the presence of toxic substances such as lead, arsenic, cadmium, chromium, mercury, nitrates, etc., that could have long-term ill effects on a consumer and/or environment. Traditional methodologies of contamination detection can be unreliable as checks may be irregular and/or prone to human error. Furthermore, it may be difficult to check each water distribution point for contamination, thereby drastically reducing the efficiency in resolving contamination issues.

FIG. 7 illustrates an example 700 involving contamination intrusion in a water supply line. In the example shown in FIG. 7, a contamination intrusion 746 is introduced in a water supply line near junction 3 due to pollutants from nearby factory 722 (F1) entering a water distribution system. Contamination in the water may be detected at home 748 (H12) and nearby homes H13-H16 (e.g., where water meters at those homes are equipped with water quality measurement sensors (e.g., as a part of, or in conjunction with, associated water meters)). Alternatively, or additionally, there may also be various water quality measurement sensors along the water distribution line. Alerts, alarms, or other abnormality reports may be sent from one or more nodes associated with the water quality measurement sensors (e.g., from associated water meters at homes H12-H16 and/or other sensors along the water supply line) to each other, to neighboring nodes, to a data collection device 104, and/or to a central office 106A/106B. An abnormality reported from such sensors from these nodes (associated with homes H12-H16) along with no such reporting from homes H10 or H11 or from factory 722 (F1) (as aggregated via data aggregator 112, for example), would indicate (via analyzer 114, for example) that the contamination is along the water supply line 750 in the vicinity of junction 3 and junction 4, and the contamination source is likely at a supply valve near junction 3.

In the example shown in FIG. 7, the contamination appears to be due to a pollutant coming from factory 722 (F1). However, there may be other causes of water contamination. Using aggregated information in the way described herein, a utility company or other entity could pinpoint location(s) of any pollutants/contamination from any source and investigate the cause of such contamination more efficiently. For example, another cause of water contamination may be water stagnation. When water is not drawn through a plumbing system over an extended period of time, the water may become stagnant. Stagnant water promotes microbial growth, pipe corrosion, and other problems that could affect water quality as well as infrastructure lifespan. If water contamination is determined present, processor 110 (via data aggregator 112 and analyzer 114, for example) may also collect and analyze water flow rates as provided by, for example, water meter nodes in the affected topology to determine if water stagnation is contributing to the deterioration in water quality. A low (or no) flow rate, or a higher in-flow rate than out-flow rate, at any point along the water line, may indicate stagnation.

Similar to the examples shown in FIGS. 3-6, in the example provided above with regard to FIG. 7, in addition to determining the occurrence of a contamination event, analyzer 114 may determine, from the aggregated data and other information (e.g., locations and/or relationships of the sensors/nodes reporting abnormalities), the extent of the event (e.g., affected area (e.g., "homes along the water supply line for two blocks southwest of factory F1")), intensity levels of the event at various locations within the affected area (e.g., if some reported contamination level readings were higher than others, etc.), etc. Once these determinations are made, this information may be reported via action module 116. For example, the contamination event and any associated collected or determined information may be reported to a central office 106A/106B and/or may be reported elsewhere by data collection device 104 or central office 106A/106B (e.g., to homeowners and/or businesses in the affected and/or immediate surrounding areas (e.g., via phone, text, alert to a monitoring application (e.g., on a smartphone or similar device), alert to an in-home/office monitoring system, etc.), to emergency services (e.g., 911 or other services) (which can then alert others in the general area as they see fit), etc.). In addition, action module 116 may provide other actions, such as, if the nodes are utility nodes, sending signals to turn off affected nodes (to protect the node devices) and/or to shut off water supplied to the sites (e.g., affected homes or businesses), or along their service lines (e.g., at valves, etc.), if leaving them on/open would be dangerous or a matter of public safety, for example. In some embodiments, perhaps depending on the situation, a consumer (e.g., homeowner, business, etc.) may have the ability to override such shut-off/shut-down actions or to take actions in response to the water quality alerts (e.g., change water filter(s)).

FIG. 8 illustrates an example 800 involving water leakage and contamination mixing in a water supply line. Leakages in supply pipes or valves may result in pathogen and contaminant intrusion in the water distribution system. This type of leakage is one of the main causes of contamination in such a system. In the example shown, a leak 854 is occurring in a water supply line between junction 1 and junction 2. The leakage in the supply pipes has resulted in contaminants mixing in the water distribution. Contamination and total dissolved solids (TDS) levels in the water may be detected at nearby homes H8 and H9 and/or at building 820 (B1) (e.g., where water meters at those sites are equipped with water quality measurement sensors (e.g., as a part of, or in conjunction with, associated water meters)). Alternatively, or additionally, there may also be various water quality measurement sensors along the water distribution line. Alerts, alarms, or other abnormality reports may be sent from one or more nodes associated with the water quality measurement sensors (e.g., from associated water meters at homes H8/H9 and/or building B1, and/or other sensors along the water supply line) to each other, to neighboring nodes, to a data collection device 104, and/or to a central office 106A/106B. An abnormality reported from such sensors from these nodes (associated with homes H8/H9 and/or building B1) along with no such reporting from homes H1-H7 (as aggregated via data aggregator 112, for example), would indicate (via analyzer 114, for example) that the contamination is along the water supply line 856 between B1 and H4. Similar to the example shown in FIG. 7, using aggregated information in this way, a utility company could pinpoint a location(s) of any pollutants/contamination and investigate the cause of such contamination more efficiently. Further analysis (e.g., of acoustics, of water pressure patterns, etc.) may help further pinpoint a more accurate location of a leak, thereby reducing costs associated with digging, etc.

Similar to the examples shown in FIGS. 3-7, in the example provided above with regard to FIG. 8, in addition to determining the occurrence of the contamination event, analyzer 114 may determine, from the aggregated data and other information (e.g., locations and/or relationships of the sensors/nodes reporting abnormalities), the extent of the event (e.g., affected area (e.g., "homes and businesses along the water supply line for two blocks southwest of junction 1")), intensity levels of the event at various locations within the affected area (e.g., if some reported contamination level readings were higher than others, etc.), etc. Once these determinations are made, this information may be reported via action module 116. For example, the contamination event and any associated collected or determined information may be reported to a central office 106A/106B and/or may be reported elsewhere by data collection device 104 or central office 106A/106B (e.g., to homeowners and/or businesses in the affected and/or immediate surrounding areas (e.g., via phone, text, alert to a monitoring application (e.g., on a smartphone or similar device), alert to an in-home/office monitoring system, etc.), to emergency services (e.g., 911 or other services) (which can then alert others in the general area as they see fit), etc.). In addition, action module 116 may provide other actions, such as, if the nodes are utility nodes, sending signals to turn off affected nodes (to protect the node devices) and/or to shut off water supplied to the sites (e.g., affected homes or businesses), or along their service lines (e.g., at valves, etc.), if leaving them on/open would be dangerous or a matter of public safety, for example. In some embodiments, perhaps depending on the situation, a consumer (e.g., homeowner, business, etc.) may have the ability to override such shut-off/shut-down actions or to take actions in response to the water quality alerts (e.g., change water filter(s)).

FIG. 9 illustrates another example (900) involving water contamination in a water supply system where the contamination may be related to backflow. Pressure in a water supply system may fall below a low-level threshold point due to, for example, large extended leaks in the system, lack of water in water storage tanks, such as water towers, cisterns, etc. (e.g., due to drought or sudden unexpected high water demand), failure of upstream distribution pumps, etc. This loss of water pressure may result in backflow from end service points which may bring contaminants into the water distribution system. It would be useful for utility companies to be able to proactively predict and/or react to backflow situations in order to lessen the impact of the backflow and to avoid large time-consuming system flushes and widespread water boil advisories for consumers of the water supply. Some current systems may attempt to control pressure in the system by using pumps strategically placed to increase pressure where it is needed. Some current systems may contain large backflow prevention mechanisms at various point in the distribution system which help prevent segments of the distribution system from cross-contaminating each other. However, these solutions do not provide isolation of backflow issues at the service point level.

A water distribution system can more efficiently determine a possible backflow situation by having the ability to detect one or more of: distribution water pressure loss or storage tank water pressure loss, water meter inlet pressure being less than water meter outlet pressure (i.e., a pressure differential), water meter decrementing past a predetermined threshold, notifications from node devices (e.g., networked water meters) that are experiencing backflow, etc. A backflow issue may be determined proactively based on the detection of lowering water levels (e.g., in water storage tank(s)) and/or lowering pressure in the water distribution system. A backflow issue may be determined in a reactive manner based on actual backflow detection at water meter endpoints (e.g., backflow alerts from decrementing water meter(s), water meter inlet/outlet pressure differential alerts, etc.). In either prevention of, or reaction to, a backflow situation, the collection, aggregation, and analysis of information from various networked nodes that are part of, or along, the water distribution system provide the information needed to make problem determinations and/or to take timely (even automated) actions to prevent or mitigate backflow-related issues in a water supply system. In general, any of these activities (data collection, aggregation, analysis, determination, and/or action-taking) may be conducted by any data collection device 104 as described herein (which may be, for example, a head-end device, edge device, node device, etc.), in a proactive or reactional manner, and this may apply to not only a backflow issue, but to various other situations described herein.

FIG. 9 illustrates a reactional example involving backflow contributing to contamination in a water supply system. In example 900 of FIG. 9, contamination 960 is occurring in a water supply line near junctions 1 and 2 along road 3. The contamination levels in the water may be detected at or near home 938 (H4) (e.g., where a node (e.g., a water meter) associated with home H4 is equipped with a water quality measurement sensor (e.g., as a part of, or in conjunction with, the associated water meter). An abnormality reported from the node at H4 would indicate contamination occurring at that H4 location. However, if this type of abnormality is reported from two or more such node devices (e.g., from node devices associated with homes H8 and H9, and/or building 920 (B1) and/or other water quality measurements sensors that may be implemented along the associated water supply line) with a known or determined relationship (e.g., within a predetermined proximity of each other and/or along the same service line, etc.) and/or within a predetermined small timeframe (e.g., within minutes, seconds, or simultaneously), the aggregation of this data (via data aggregator 112, for example) as analyzed (via analyzer 114) could instead indicate more widespread contamination. Such alerts, alarms, or other abnormality reports may be sent from one or more nodes associated with water quality measurement sensors (e.g., from associated water meters at homes H4/H8/H9 and/or building B1 if they are so equipped with such sensors, and/or other water quality measurement sensors along the water supply line) to each other, to neighboring nodes, to a data collection device 104, and/or to a central office 106A/106B. An abnormality reported from such sensors associated with these nodes (e.g., associated with homes H4/H8/H9 and/or building B1) along with no such reporting from homes H1-H3, H5-H7, and H10-H16 (as aggregated via data aggregator 112, for example), would indicate (via analyzer 114, for example) that there is contamination present along the water supply line 962 southwest of junction 1. In addition, as shown in FIG. 9, sites H4, H8, H9, and/or B1 may have water meters that are equipped to detect water pressure (e.g., at the inlet and outlet of the water meter, where a lower inlet pressure than outlet pressure (a pressure differential) may indicate a backflow) and/or to directly detect a backflow situation (e.g., where a meter register of the water meter node may decrement water flow instead of increment water flow beyond a predetermined threshold). Abnormality reports indicating a backflow issue from these nodes (e.g., at H4, H8, H9 and/or B1) and/or other nodes nearby in addition to the above-described reported water quality issues may further indicate that the contamination may be caused from a backflow issue.

Similar to the examples shown in FIGS. 3-8, in the example provided above with regard to FIG. 9, in addition to determining the occurrence of the contamination event, analyzer 114 of data collection device 104 may determine, from the aggregated data and other information (e.g., locations and/or relationships of the sensors/nodes reporting abnormalities), the extent of the event (e.g., affected area (e.g., "homes and businesses along the water supply line for two blocks southwest of junction 1")), intensity levels of the event at various locations within the affected area (e.g., if some reported contamination level readings were higher than others, etc.), etc. Once these determinations are made, this information may be reported via action module 116 of data collection device 104. For example, the contamination event and any associated collected or determined information may be reported from data collection device 104 to a central office 106A/106B and/or may be reported elsewhere by data collection device 104 or central office 106A/106B (e.g., to homeowners and/or businesses in the affected and/or immediate surrounding areas (e.g., via phone, text, alert to a monitoring application (e.g., on a smartphone or similar device), alert to an in-home/office monitoring system, etc.), to emergency services (e.g., 911 or other services) (which can then alert others in the general area as they see fit), etc.). In addition, action module 116 may provide other actions, such as, if the nodes are utility nodes (e.g., water meters), sending signals to turn off affected node devices (to protect the node devices) and/or to shut off water supplied to the affected sites (and possibly neighboring sites) at service point level disconnect valves (e.g., at affected or nearby homes or businesses), or along their service lines (e.g., at appropriate gate station valves, etc.), if leaving them on/open would be dangerous or a matter of public safety, for example. In some embodiments, perhaps depending on the situation, a consumer (e.g., homeowner, business, etc.) may have the ability to override such shut-off/shut-down actions or to take actions in response to the water quality alerts (e.g., change water filter(s)). Other mitigation actions that may be taken include sending signal(s) to engage pressure increasing pumps in the appropriate portion(s) of the distribution system and/or to open runoff valves to flush the appropriate portion(s) of the distribution system. In an embodiment, after pipe flushing activities (which themselves may lower system pressure), when it is determined that sufficient pressure is restored in the pipes, a signal may be sent to automatically begin opening back up gate and service point valves in an appropriate coordinated manner. Some of the described detection and mitigation examples involving backflow are illustrated in FIGS. 10 and 11.

Figure 10:
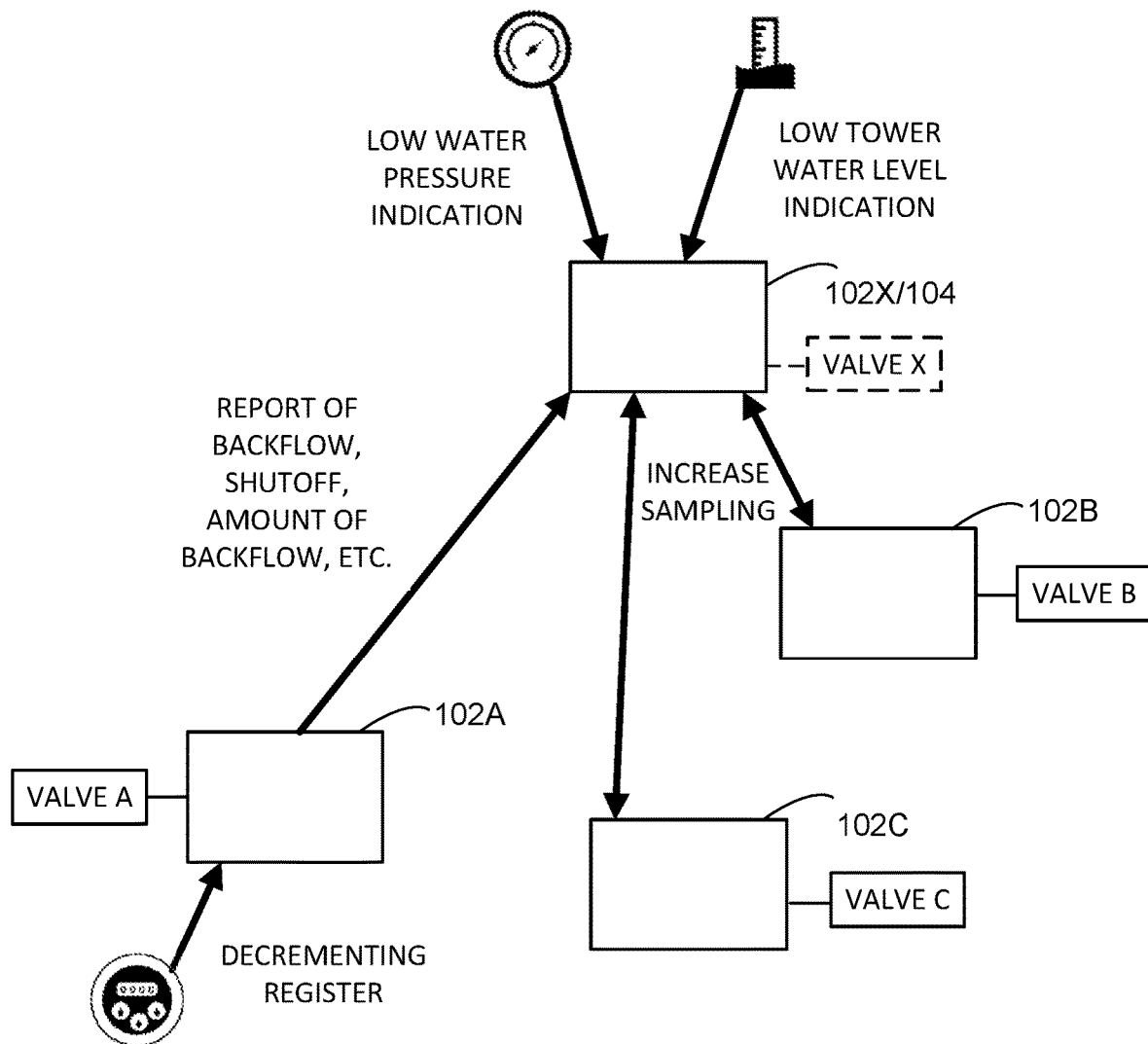
FIG. 10 is a block diagram illustrating examples of inputs used to determine a backflow problem in a water distribution system, according to embodiments of the present disclosure.
Figure 11:
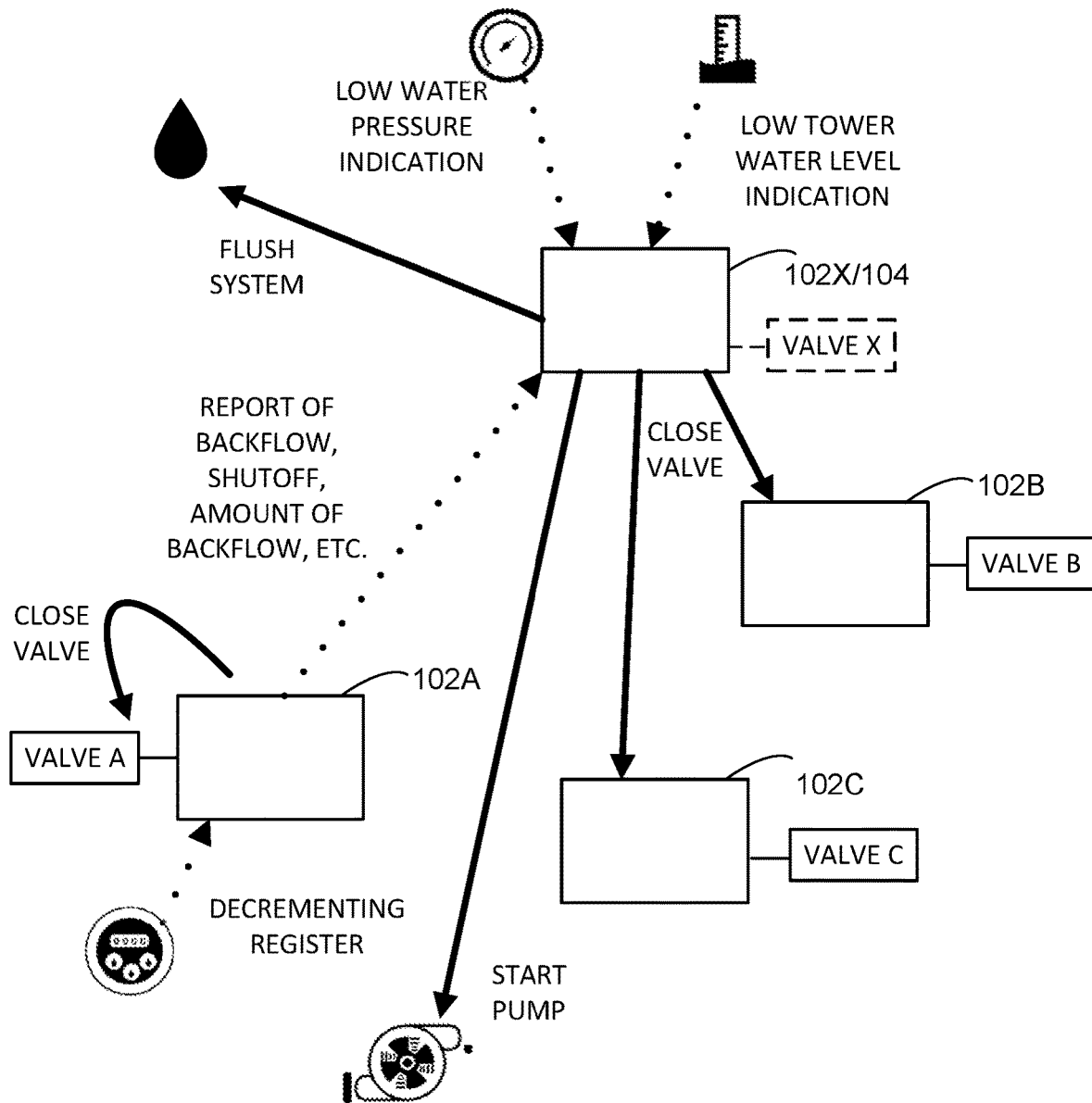
FIG. 11 is a block diagram illustrating examples of mitigation actions that may be taken in response to a detected backflow problem in a water distribution system, according to embodiments of the present disclosure.

While the above example is reactional, as mentioned above, a backflow situation may be handled in a proactive manner (as illustrated in FIG. 10). For example, a data collection device 104 receives an alert of low water pressure and/or low storage tank water level, and/or if it receives a backflow alert from one or more water meter nodes, it may share this information by sending it to other water meter nodes or related nodes to further check for backflow issues themselves (e.g., by requesting or prompting an increase in sampling/reporting (increasing register read rate and/or reporting rate) from the other nodes in order to determine a possible, or extended, backflow issue more quickly). If a data collection device 104 or node 102 itself is a water meter node and receives a backflow alert from another node, it may increase its sampling reporting (either in response to a request for increased sampling or on its own based on the received backflow alert from the other node), shut off its water supply at the appropriate valve, and/or, if a backflow issue is detected, send a backflow alert and possibly other information (e.g., amount of backflow, etc.) to a head-end or central office. To summarize, nodes 102 that receive backflow alerts from other node devices 102 may then check for backflow issues themselves (e.g., by increasing sampling/reporting, checking for an inlet/outlet pressure differential, checking for a decrementing meter register, etc.) and, if a backflow issue is determined, may then take the appropriate action(s). If a backflow issue anywhere in the system is determined by a data collection device 104, data collection device 104 may mitigate the situation in any of the manners described above (some of which are shown in FIG. 11) to the extent possible (e.g., based on service topology information that it has available, etc.).

The use of aggregated information from the nodes 102 may help to detect a backflow situation more quickly and allow for mitigation actions to be performed automatically in a timely manner to aid the benefit of cost savings due to avoiding non-revenue water loss from excessive system flushing, which may involve tens of millions of gallons of already treated water. The cost of treating that wasted water and the lost service point revenue from it may be significant depending on the size of in preventing backflow of contaminants in a water distribution system, minimizing the level of contamination, and isolating contaminant problems to smaller areas of the water distribution system. The sharing of information among the nodes 102 (e.g., using distributed intelligence) allows reaction time to be further decreased thereby further contributing to the containment of the problem. In short, these techniques aid in minimizing, isolating, and preventing system contamination due to backflow from service points or other points in the water distribution system. There is also the water distribution system.

Figure 12:
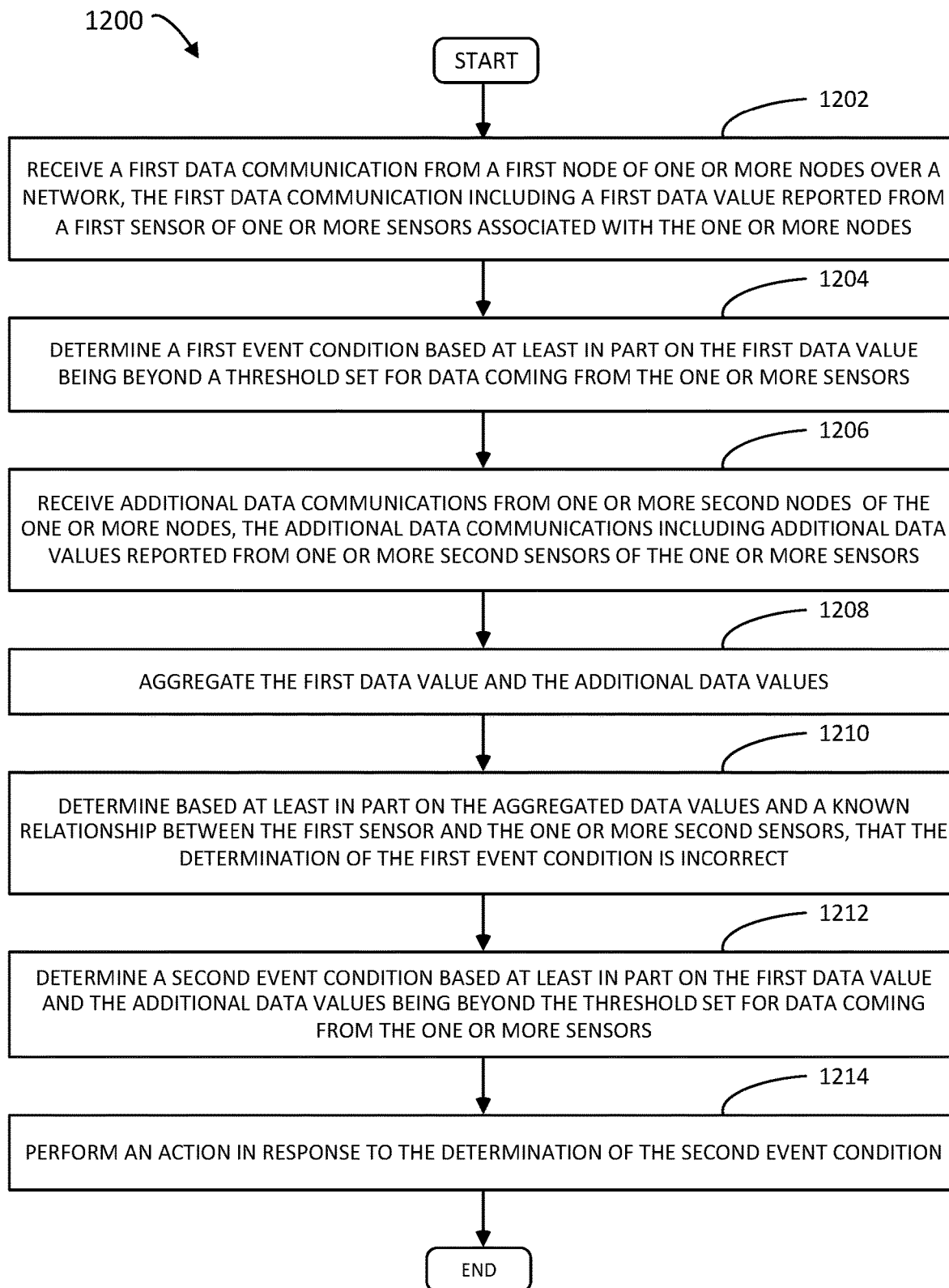
FIG. 12 is a flow diagram illustrating an example method in which an alternative event condition may be determined, according to an embodiment of the present disclosure.

FIG. 12 is a flow diagram illustrating an example method 1200 in which an alternative event condition may be determined by a data collection device, according to an embodiment of the present disclosure. Example method 1200 may be applied in any of the scenario examples provided herein, including any of the scenarios as described with reference to FIGS. 3-9. For example, in the description that follows, the example scenario shown in FIG. 3 is used to assist in the description of example method 1200, for simplicity of discussion and understanding.

Example method 1200 begins at 1202, where a first data communication may be received by a data collection device (e.g., data collection device 104, via transceiver 108) from a first node of one or more nodes over a network, where the first data communication includes a first data value reported from a first sensor of one or more sensors that are associated with the one or more nodes. As described earlier, the data collection device may be any node 102/104 (as shown in FIG. 1), which may be an edge device or other device configured to communicate with other nodes 102 and/or a computing device at a central office 106, or may be itself located at central office 106. The one or more sensors may be associated with any node 102, or may be along a service line associated with any node 102, and may be any type of sensor as described above with reference to FIGS. 3-9 and as further described below with reference to FIG. 21. Readings/measurements of the sensors may be communicated over the network via transceivers of their associated node devices. At 1204, a first event condition may be determined by data collection device 104 (e.g., via analyzer 114) based at least in part on the first data value being beyond a threshold set for data coming from the one or more sensors. In one example, as described with reference to FIG. 3, a node (e.g., a utility meter) at a single home may have reported movement at a sensor associated with the node, and data collection device 104 may have determined (via analyzer 114) that there was tampering occurring at that utility meter.

At 1206, additional data communications may be received by data collection device 104 (e.g., via transceiver 108) from one or more second nodes of the one or more nodes, the additional data communications including additional data values reported from one or more second sensors of the one or more sensors, the second sensors associated with the one or more second nodes. At 1208, the first data value and the additional data values may be aggregated (e.g., via data aggregator 112). That is, the data is collected and analyzed together in order to make a determination. At 1210, a determination that the determined first event condition is incorrect may be made (via analyzer 114) based at least in part on the aggregated data values and a known relationship between the first sensor and the one or more second sensors (or between the nodes associated with those sensors). The known relationships may include, for example but not limitation, known physical locations of the first sensor/node and the second sensors/nodes and/or their physical proximity to each other, any defined logical groupings of the first sensor/node and the second sensors/nodes, neighborhood(s) that include the first sensor/node and the second sensors/nodes, zip codes of the locations of the first sensor/node and the second sensors/nodes, service line topology associated with the first sensor/node and the second sensors/nodes, transformer topology associated with the first sensor/node and the second sensors/nodes, service capacities (e.g., how much of a resource each site is capable of consuming or usually consumes) at the locations of the first sensor/node and the second sensors/nodes, etc. In our example with reference to FIG. 3, reports of possible 'tampering' from many sites, especially within a predetermined short amount of time, would indicate that the first report coming from a single home as being an isolated tamper event at that node is incorrect. At 1212, a second event condition may be determined (instead of the first event condition) based at least in part on the first data value and additional data values being beyond the threshold set for data coming from the one or more sensors (e.g., from 'tamper'-related sensors when considering the example with reference to FIG. 3). In the example of FIG. 3, since multiple sensors at multiple sites in proximity of each other are indicating a 'tamper' event, it may be determined (by analyzer 114) that the event is not a 'tamper' event, but instead is an earthquake, explosion, or other event that may trigger such sensors.

At 1214, an action may be performed (e.g., via action module 116) in response to the determination of the second event condition. As discussed above, the performed action may include, for example but not limitation, sending a reporting alert reporting the determined second event condition to an entity that manages the one or more nodes and sensors (e.g., a utility company or other type of service provider associated with the one or more nodes and sensors), sending an emergency alert to emergency services informing emergency services of the determined second event condition, sending a consumer alert to consumer device(s) informing affected consumers of the determined second event condition, sending a disconnection signal to affected node devices or to an intermediary device (e.g., transformer) to disconnect a service to the affected consumers, sending a closure signal to valve controllers to close valves of one or more gas or water pipelines; and/or sending a shutdown signal to devices associated with the one or more nodes to shut down one or more devices associated with the one or more nodes/sensors. In some embodiments, a consumer (e.g., homeowner, business, etc.) may have the ability to take actions in response to receiving an alert and/or may override such shut-off/shut-down actions (e.g., if the benefits of continuing the service outweigh the risks of turning it off). As would be understood, some of these actions may be taken as a matter of public safety, to protect property and/or node devices, etc., so in many scenarios, it would not be prudent to override service shut-offs that were effected due to potentially dangerous situations.

Figure 13:
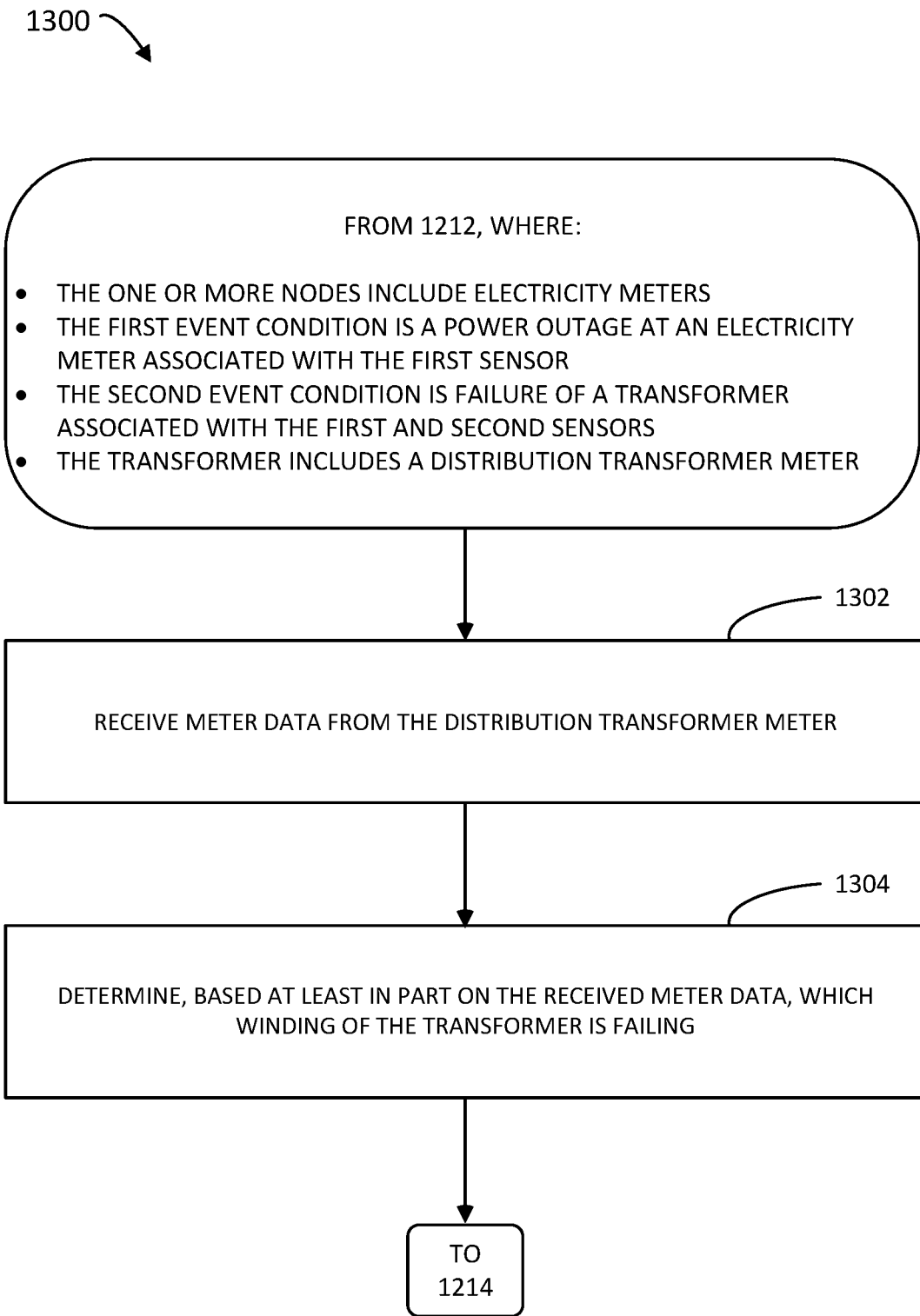
FIG. 13 is a flow diagram extension of FIG. 12 illustrating determination of a transformer issue in the example neighborhood of FIG. 6, according to an embodiment of the present disclosure.

FIG. 13 is a flow diagram extension of FIG. 12 illustrating an example method 1300 of determination of a transformer issue in the example neighborhood of FIG. 6, according to an embodiment of the present disclosure. Example method 1300 stems from block 1212, and involves a scenario in which the one or more nodes include electricity meters, the first event condition was determined to be a power outage at an electricity meter associated with the first sensor, the second event condition was determined to be a failure of a transformer associated with the first and second sensors, and the transformer includes a distribution transformer meter (DTM). At 1302, meter data is received by data collection device 104 from the DTM. The meter data may include readings from temperature sensors at the windings of the transformer. At 1304, it is determined (e.g., via analyzer 114) which winding of the transformer is failing, based at least in part on the received meter data (e.g., based on temperature data associated with a winding being higher than a predetermined threshold for such temperature at such winding). The method then continues at 1214 of FIG. 12.

Figure 14:
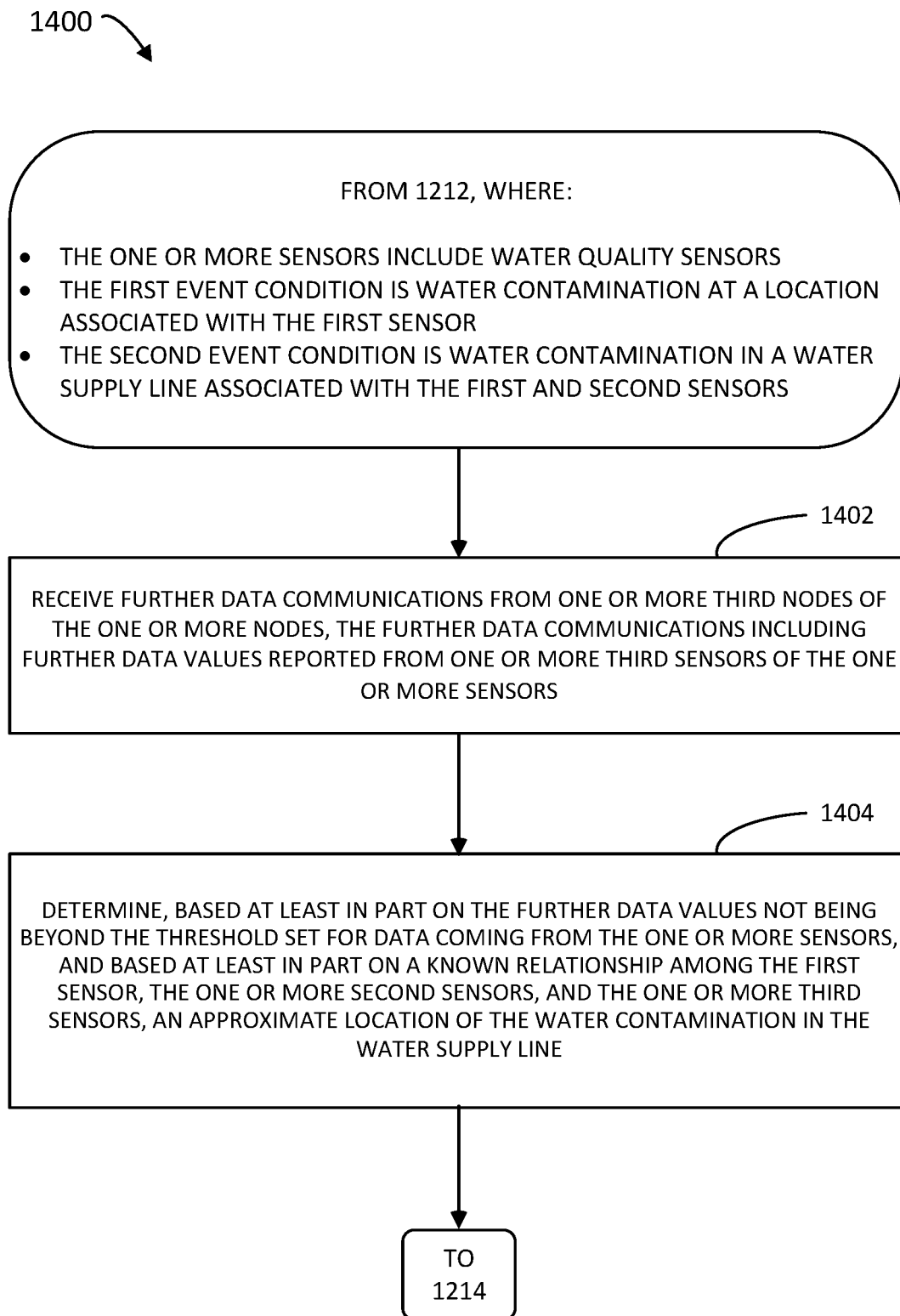
FIG. 14 is a flow diagram extension of FIG. 12 illustrating determination of an approximate location of water contamination in the example neighborhood of FIG. 7 and/or FIG. 8, according to an embodiment of the present disclosure.

FIG. 14 is a flow diagram extension of FIG. 12 illustrating an example method 1400 of determination of an approximate location of water contamination in the example neighborhood of FIG. 7, according to an embodiment of the present disclosure. Example method 1400 stems from block 1212, and involves a scenario in which the one or more sensors include water quality sensors, the determined first event condition is water contamination at a location associated with the first sensor, and the determined second event condition is water contamination in a water supply line associated with the first and second sensors. At 1402, further data communications are received by data collection device 104 from one or more third nodes of the one or more nodes, the further data communications including further data values reported from one or more third sensors of the one or more sensors, the third sensors associated with the one or more third nodes. At 1404, an approximate location of the water contamination in the water supply line is determined, based at least in part on the further data values not being beyond the threshold set for data coming from the one or more sensors and based at least in part on a known relationship among the first sensor, the second sensors, and the third sensors (or among the nodes associated with those sensors). In this example, the first sensor, the second sensors, and the third sensors may be measuring similar data points (e.g., similar water quality measurements). With the locations (and optionally also the proximities) of the first sensor, the second sensors, and the third sensors being known, an approximate location of the contamination would likely then be between where the first and second sensors are reporting contamination and where the third sensors are not reporting contamination. The method then continues at 1214 of FIG. 12.

Figure 15:
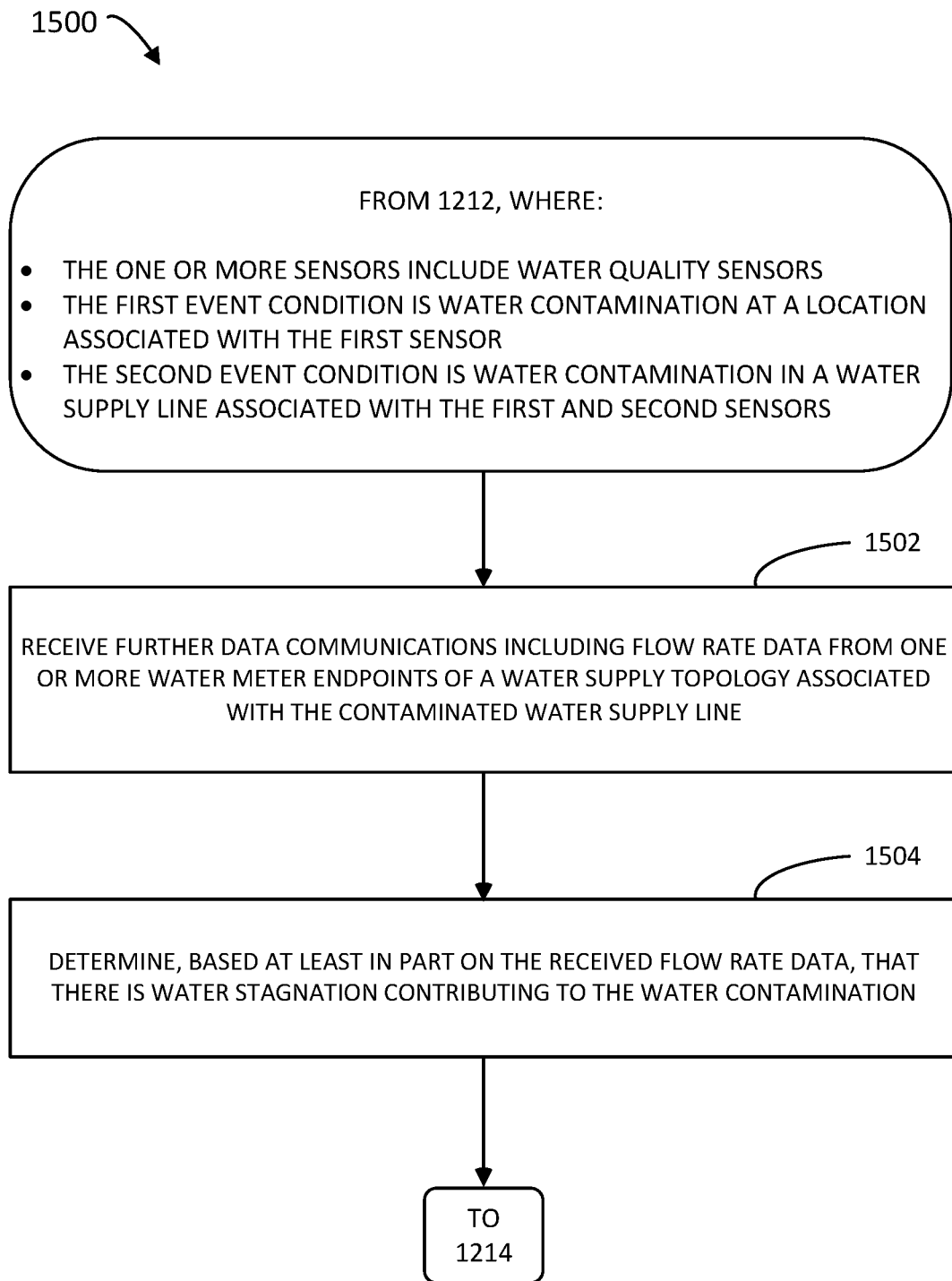
FIG. 15 is a flow diagram extension of FIG. 12 illustrating determination of water stagnation contributing to water contamination in a water supply line in the example neighborhood of FIG. 8, according to an embodiment of the present disclosure.

FIG. 15 is a flow diagram extension of FIG. 12 illustrating an example method 1500 of determination of water stagnation contributing to water contamination in a water supply line in the example neighborhood of FIG. 7 or FIG. 8, according to an embodiment of the present disclosure. Example method 1500 stems from block 1212, and involves a scenario in which the one or more sensors include water quality sensors, the determined first event condition is water contamination at a location associated with the first sensor, and the determined second event condition is water contamination in a water supply line associated with the first and second sensors. At 1502, further data communications are received by data collection device 104 including flow rate data from one or more water meter endpoints of a water supply topology associated with the contaminated water supply line. At 1504, the presence of water stagnation is determined to be contributing to the water contamination based at least in part on the received flow rate data. As described earlier, a low flow rate, or a higher in-flow rate than out-flow rate at any point along the water line, may indicate stagnation. The method then continues at 1214 of FIG. 12.

Figure 16:
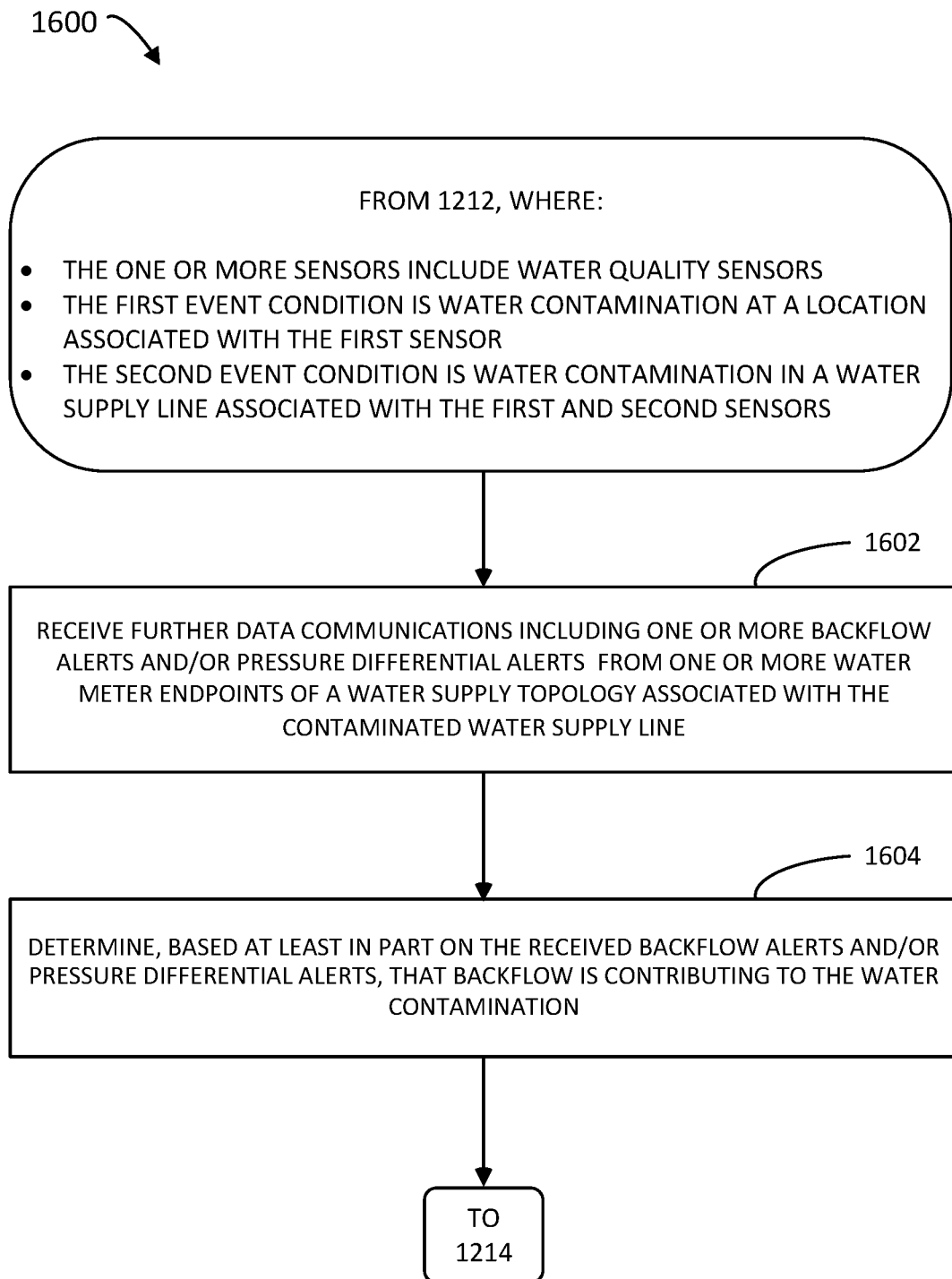
FIG. 16 is a flow diagram extension of FIG. 12 illustrating determination of backflow contributing to water contamination in a water supply line in the example neighborhood of FIG. 9, according to an embodiment of the present disclosure.

FIG. 16 is a flow diagram extension of FIG. 12 illustrating an example method 1600 of determination of water backflow contributing to water contamination in a water supply line in the example neighborhood of FIG. 9, according to an embodiment of the present disclosure. Example method 1600 stems from block 1212, and involves a scenario in which the one or more sensors include water quality sensors, the determined first event condition is water contamination at a location associated with the first sensor, and the determined second event condition is water contamination in a water supply line associated with the first and second sensors. At 1602, further data communications including one or more backflow alerts and/or pressure differential alerts (as described earlier with reference to FIG. 9) are received by data collection device 104 from one or more water meter endpoints of a water supply topology associated with the contaminated water supply line. At 1604, water backflow is determined to be contributing to the water contamination based at least in part on the received backflow alerts and/or pressure differential alerts. The method then continues at 1214 of FIG. 12.

Figure 17:
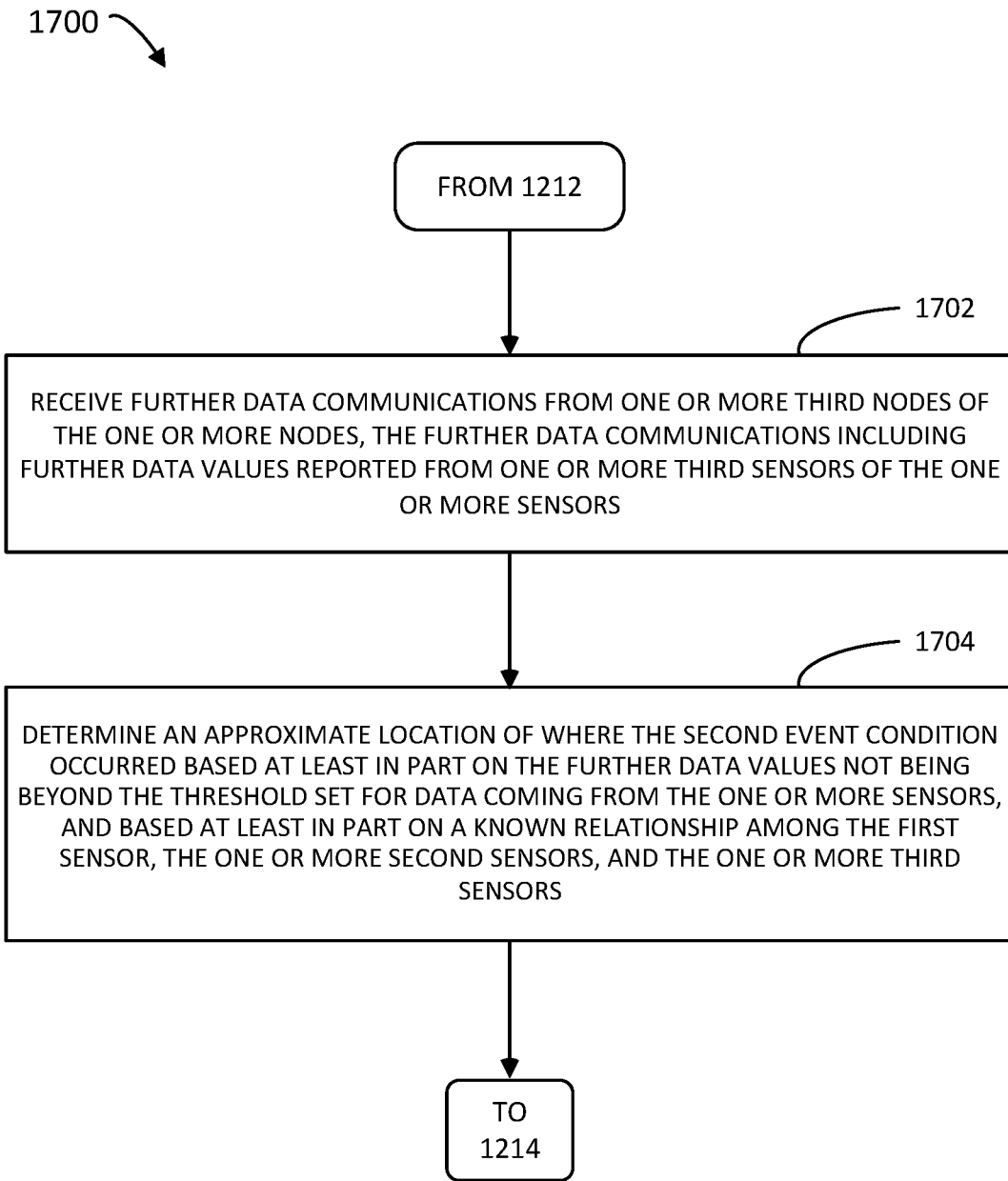
FIG. 17 is a flow diagram extension of FIG. 12 illustrating determination of location or physical extent of an event condition, according to an embodiment of the present disclosure.

FIG. 17 is a flow diagram extension of FIG. 12 illustrating an example method 1700 of determination of location or physical scope or extent of an event condition, according to an embodiment of the present disclosure. Example method 1700 stems from block 1212. At 1702, further data communications are received by data collection device 104 from one or more third nodes of the one or more nodes, the further data communications including further data values reported from one or more third sensors of the one or more sensors, the third sensors associated with the one or more third nodes. At 1704, an approximate location of where the determined second event location occurred may be determined based at least in part on the further data values not being beyond the threshold set for data coming from the one or more sensors, and based at least in part on a known relationship among the first sensor, the second sensors, and the third sensors (or among the nodes associated with those sensors). In an embodiment, the first sensor, the second sensors, and the third sensors may be measuring similar data points (e.g., all are measuring tamper-related data points, all are measuring temperature, all are detecting power outages, etc.). With this information, the extent or bounds of the effect of a determined event condition (e.g., the area reach of an earthquake, flood, power outage, etc.) may be determined. The method then continues at 1214 of FIG. 12.

Figure 18:
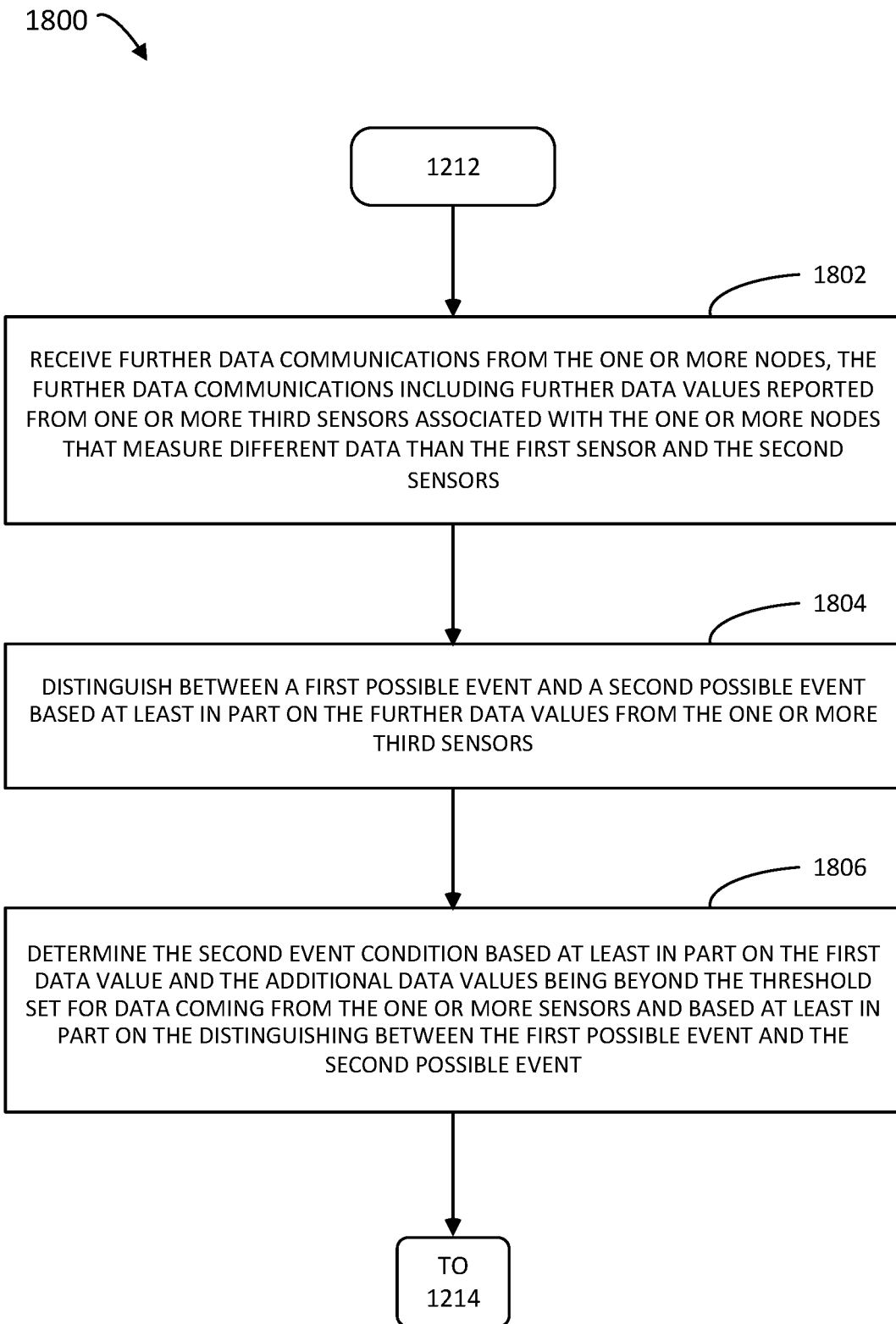
FIG. 18 is a flow diagram extension of FIG. 12 illustrating distinguishing of one possible event from another possible event based on sensor data, according to an embodiment of the present disclosure.

FIG. 18 is a flow diagram extension of FIG. 12 illustrating an example method 1800 of distinguishing one possible event from another possible event based on sensor data, according to an embodiment of the present disclosure. Example method 1800 is an embodiment of block 1212 of FIG. 12. At 1802, further data communications are received by data collection device 104 from the one or more nodes, the further data communications including further data values reported from one or more third sensors associated with the one or more nodes that measure different data than the first sensor and the second sensors. At 1804, a first possible event and a second possible event are distinguished between (e.g., via analyzer 114) based at least in part on the further data values from the one or more third sensors. At 1806, the second event condition is determined based at least in part on the first data value and the additional data values being beyond the threshold set for data coming from the one or more sensors and based at least in part on the distinguishing between the first possible event and the second possible event, which is based at least in part on the further data values from the one or more third sensors. One example of this was discussed with reference to FIG. 5, where short circuit alerts in conjunction with over-temperature alerts may indicate a fire, short circuit alerts with the absence of over-temperature alerts, tamper alerts, or other alerts, would indicate a flood rather than another type of event (e.g., a fire). The method then continues at 1214 of FIG. 12.

Figure 19:
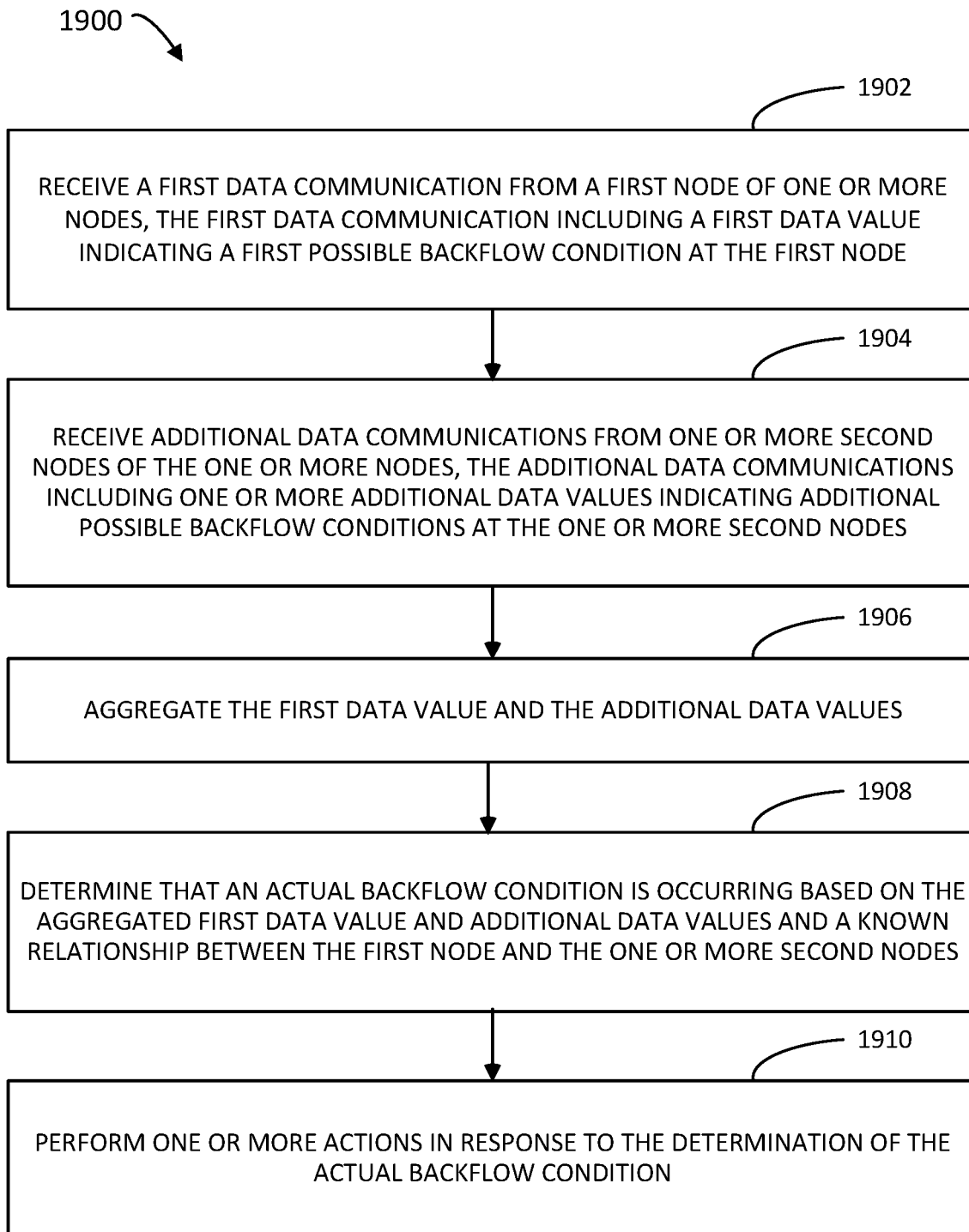
FIG. 19 is a flow diagram illustrating determination of a backflow condition in a water distribution system, according to an embodiment of the present disclosure.

FIG. 19 is a flow diagram 1900 illustrating determination of a backflow condition in a water distribution system, according to an embodiment of the present disclosure. At 1902, a first data communication may be received by a data collection device 104 from a first node (e.g., a water meter node, water storage tank node, pressure sensor in the water distribution system, etc.) of one or more nodes 102 associated with a water distribution system. The first data communication may include one or more first data values indicating a first possible backflow condition at the first node. For example, the one or more first data values may include an indication that the register of the first node (if a water meter) is decrementing rather than advancing. In another example where the first node is a water meter, the one or more first data values may include an indication of a pressure differential where water pressure at an inlet of the water meter is less than at an outlet of the water meter. In yet another example, the one or more first data values may include a low water pressure indication from a water pressure sensor in the water distribution system. In a further example, the one or more first data values may include a low water level indication from a water level sensor of a water storage tank (e.g., water tower, cistern, etc.) in the water distribution system. The first data values may include other indications of backflow, as one of ordinary skill in the art would recognize. At 1904, additional data communications from one or more second nodes (e.g., water meters) of the one or more nodes 102 may be received by data collection device 104. The additional data communications may include one or more additional data values indicating additional possible backflow conditions at the one or more second nodes. The additional data values and their indications of backflow may be similar to those described in the above description of the first data values. At 1906, the first data value(s) and the additional data value(s) may be aggregated and analyzed. At 1908, the data collection device 104 may determine that an actual backflow condition is occurring based on the aggregated first data value(s) and additional data value(s) and a known relationship (as described earlier herein) between the first node and the one or more second nodes.

At 1910, the data collection device 104 may perform one or more actions in response to the determination of the actual backflow condition. For example, in response determining an actual backflow condition, the data collection device 104, if also a node 102, may check for a backflow-related indication in a water meter associated with data collection device 104 (e.g., by checking for a decrementing register and/or an inlet/outlet pressure differential). If a backflow condition at data collection device 104 is determined, data collection device 104 may mitigate by closing an associated valve, increasing a rate of sampling and/or reporting (e.g., of water consumption data, of pressure sensor data, etc.), sending a report regarding the determined backflow condition to a central office, etc. In other examples, data collection device 104 may send a rate increase request to the one or more nodes 102 to increase their respective sampling and/or reporting rates, and/or send a close request to one or more nodes 102 to close respective associated valves. In further examples, data collection device 104 may send a pump request to one or more pumps in the water distribution system to increase water pressure in an appropriate section of the water distribution system, and/or send a flush request to flush an appropriate section of the water distribution (e.g., depending on knowledge of the topology system and backflow-related information received from nodes 102). Data collection device 104 may send a report of the actual backflow condition to a central office associated with the water distribution system, which may include a report of any of the various collective data, analyses, determinations, and/or mitigation actions taken. In an example where a valves are closed and/or a system flush is initiated by data collection device 104, data collection device 104 may determine, after flushing, that sufficient pressure has been restored in the water distribution system and may send re-open requests to the appropriate nodes 102 to re-open the closed valves in a coordinated manner.

Example Network Environment(s)/Device(s)

Figure 20:
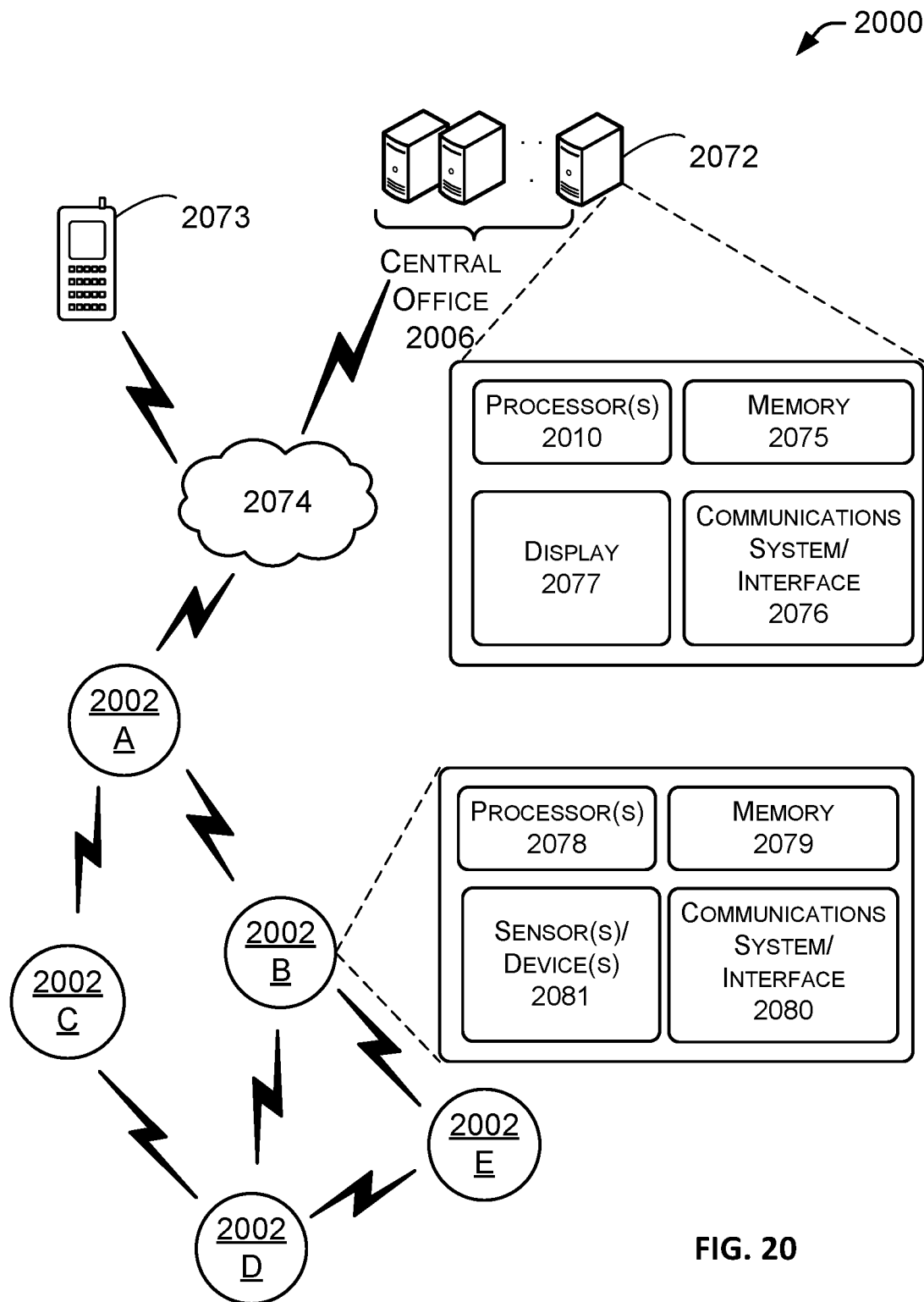
FIG. 20 is an illustration of an example network environment in which example methods, apparatus, and articles of manufacture disclosed herein may be implemented, according to embodiments of the present disclosure.

FIG. 20 is an illustration of an example network environment in which methods, apparatus, and articles of manufacture disclosed herein may be implemented, according to embodiments of the present disclosure. For example, nodes 102 and/or data collection device 104 of FIG. 1 may be a part of an advanced communication system (e.g., an Internet of Things (IoT) system or an advanced meter reading (AMR) network or advanced metering infrastructure (AMI) network of a utility related application), such as data collection network 2000 of FIG. 20, according to embodiments. Data collection network 2000 may include a central office 2006, which may be associated with a data collection/processing entity (e.g., a utility company, in the case of an AMR or AMI network). The central office may include one or more central computing device(s) 2072 (e.g., in some embodiments, a data collection device 104) that may communicate with network nodes through one or more networks 2074, which may be the Internet or other network having widespread or local functionality (local area network (LAN), wide area network (WAN), etc.). Network nodes may include nodes 2002A-2002E (collectively, nodes 2002), which may include, for example, nodes 102 and may comprise IoT devices, devices that may comprise sensors, actuators, etc., endpoint devices such as utility meters (e.g., gas meters, water meters, electric meters, etc.) or other devices. These nodes may be located at various sites or locations (e.g., homes, businesses, any buildings, streetlights, utility poles, etc.). Nodes 2002 may be configured in a mesh network, star network or other configuration. While only five nodes 2002 are illustrated for simplicity, there may be any number of network nodes. One or more of the network nodes (e.g., device 2002A) may be a data collector and/or concentrator (e.g., a data collection device 104) that may be configured for communication (e.g., radio frequency (RF) communication, cellular communication, power line communication (PLC), ZigBee, etc.) with a plurality of downstream nodes 2002B-2002E, which may also be configured for similar communications. In an example operation, data collector 2002A may send and/or receive data or other communications to and/or from nodes 2002B-2002E to be provided to a device 2072, (which may be located at central office 2006) and/or a mobile device 2073. For example, in an AMR or AMI network, data collector 2002A may collect data from nodes 2002B-2002E that may include consumption data, sensor data, or other information associated with a utility meter (e.g., a gas meter, a water meter, an electricity meter, etc.). Additionally, data collector 2002A may send software updates, firmware updates, instructions or other information (which may have been communicated to data collector 2002A from device 2072 or 2073, for example) to one or more of the nodes 2002B-2002E. In an embodiment, data collector node 2002A (or any of nodes 2002) may perform actions similar to the actions herein described for device 2072 and/or mobile device 2073, including actions performed by a data collection device 104. In an embodiment, one or more network nodes (e.g., nodes 2002A-2002E) may be powered by a battery.

In an expanded view, device 2072 (and/or mobile device 2073) may include, among other components, one or more controllers or processors 2010, a memory 2075, one or more communication systems and/or interfaces 2076 (e.g., configured for RF communications, cellular communications, and/or another type of communications), and optionally a display 2077. Nodes 2002 may include, among other components, one or more controllers or processors 2078, a memory 2079, one or more communication systems and/or interfaces 2080 (e.g., configured for RF communications, cellular communications, and/or another type of communications), and one or more sensors/devices 2081, which may include, for example, one or more measurement sensors (e.g., any of the sensors discussed herein) or other devices (e.g., meter(s), actuator(s), light(s), IoT device(s), etc.).

One or more features disclosed herein may be implemented in hardware, software, firmware, and/or combinations thereof, including discrete and integrated circuit logic, application specific integrated circuit (ASIC) logic, Field-Programmable Gate Array (FPGA) logic, Programmable Logic Controller (PLC) logic, and microcontrollers, and may be implemented as part of a domain-specific integrated circuit package, or a combination of integrated circuit packages. The terms software and firmware, as may be used herein, refer to a computer program product including at least one computer readable medium having computer program logic, such as computer-executable instructions, stored therein to cause a computer system to perform one or more features and/or combinations of features disclosed herein. The computer readable medium may be transitory or non-transitory. An example of a transitory computer readable medium may be a digital signal transmitted over a radio frequency or over an electrical conductor, over an electromagnetic wave guide, over a fiber optic cable, through a local or wide area network, through a Personal Area Network (PAN) or a Field Area Network (FAN), or through a network such as the Internet. An example of a non-transitory computer readable medium may be a compact disk, a flash memory, SRAM, DRAM, a hard drive, a solid-state drive, or other data storage device.

A processing platform of device 2072, mobile device 2073, and/or a node (e.g., any of devices 2002) may be embodied in any type of mobile and/or non-mobile computing device. Examples of mobile devices may include, but are not to be limited to, laptop computers, ultra-laptop computers, tablets, touch pads, portable computers, handheld computers, palmtop computers, personal digital assistants (PDAs), e-readers, cellular telephones, combination cellular telephone/PDAs, mobile smart devices (e.g., smart phones, smart tablets, etc.), mobile internet devices (MIDs), mobile messaging devices, mobile data communication devices, mobile media playing devices, cameras, mobile gaming consoles, wearable devices, mobile industrial field devices, etc. Examples of non-mobile devices may include, but are not to be limited to, servers, personal computers (PCs), Internet appliances, televisions, smart televisions, data communication devices, media playing devices, gaming consoles, industrial field devices (e.g., utility meters or other sensors or devices), etc.

Figure 21:
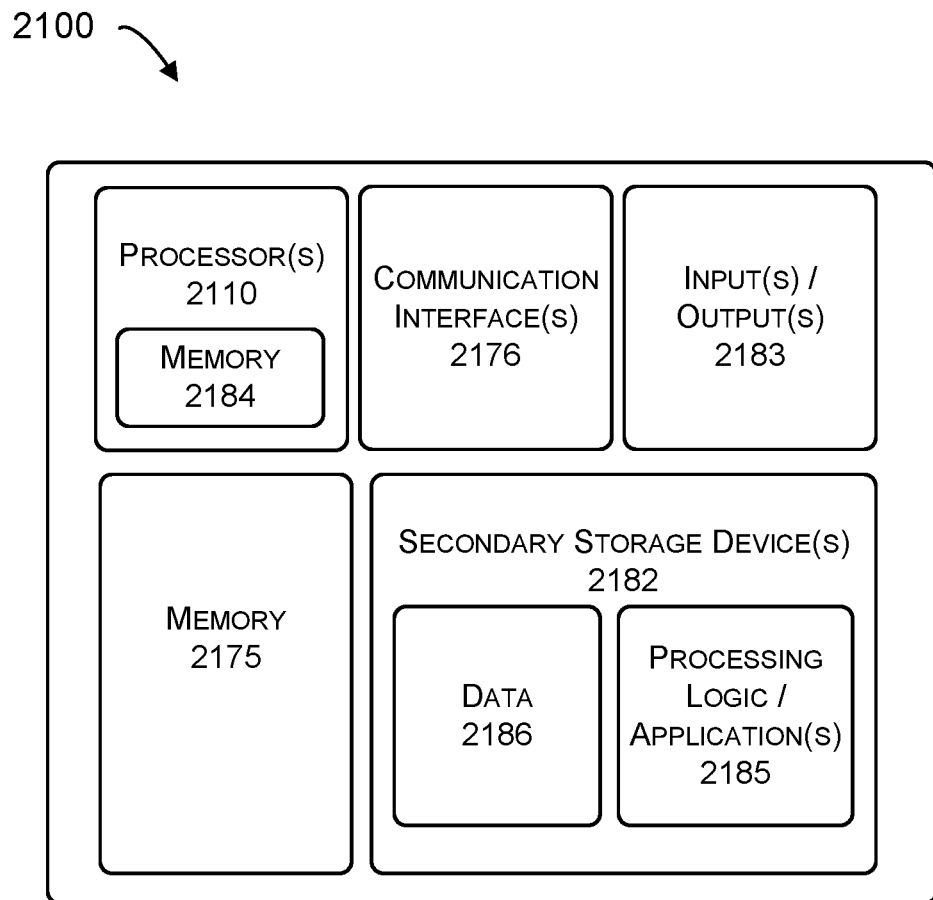
FIG. 21 is a block diagram showing various components of an example data collection device (e.g., device 104 of FIG. 1, or device 2002, 2072, or 2073 of FIG. 20), according to an embodiment of the present disclosure.

FIG. 21 is a block diagram of an example processing platform 2100 of a mobile or non-mobile data collection device (e.g., device(s) 104, 2072, 2073, or any node 102/2002 if configured to perform as a data collection device), according to embodiments. Processing platform 2100 may include one or more processors 2110, memory 2175, one or more secondary storage devices 2182, one or more input/output ports or devices 2183, and/or one or more communication interfaces 2176, in communication via a bus, line, or similar implementation (not shown). Processing platform 2100 may also include a power supply (not shown), which may include an interface to an electricity source and/or may include one or more batteries.

Processor(s) 2110 may be implemented by, for example but not limitation, one or more integrated circuits, ASIC circuits, FPGA circuits, PLC circuits, PLD, circuits, logic circuits, microprocessors, controllers, etc. Processor(s) 2110 may include a local memory 2184 (e.g., a cache), an arithmetic logic unit (ALU), an internal or external bus controller, an internal register file, a floating point unit, a digital signal processor (DSP), an interrupt controller, or a memory management unit (MMU). Memory 2175 may include a volatile and/or a non-volatile memory. Volatile memory may be implemented by Static RAM (SRAM) and/or Dynamic RAM (DRAM) of any type, including but not limited to: Synchronous Dynamic Random Access Memory (SDRAM), Dynamic Random Access Memory (DRAM), and/or any other type of random access memory device. Non-volatile memory may be implemented by flash memory and/or any other desired type of memory device. Access to memory 2175 may be controlled by a memory controller (not shown). Data stored in memory 2175 and/or local memory 2184 may be used by processor(s) 2110 to facilitate data collection functions and/or communications, determinations/calculations/computations (e.g., if not done at the node device(s) or elsewhere), etc., according to embodiments of this disclosure.

Input/output port(s)/device(s) 2183 may allow a user or an external device to interface with processor(s) 2110. Input devices may allow a user to enter data and/or commands for processor(s) 2110. Input devices may include, for example, an audio sensor, a microphone, a camera (e.g., still, video, etc.), a keyboard, a button, a mouse, a touchscreen, a track-pad, a trackball, isopoint, a voice recognition system, etc. Output devices may provide or present information to a user. Output devices may include, for example, display devices such as display device 2077 of FIG. 20. Examples of other display devices may include a light emitting diode (LED), an organic light emitting diode (OLED), a liquid crystal display, a cathode ray tube display (CRT), a touchscreen, a tactile output device, a printer, speakers, etc. The input/output port(s)/device(s) may be connected to processor(s) 2110, for example, with an interface circuit (not shown). The interface circuit may be implemented by any type of interface standard, such as, for example, an Ethernet interface, a universal serial bus (USB), a PCI express interface, etc. For use with an output device, the interface circuit may include a graphics driver card, chip, and/or processor.

Communication interface(s) 2176 may be implemented in hardware or a combination of hardware and software, and may provide wired or wireless network interface(s) to one or more networks, such as network 2074. Communication interface(s) 2176 may be a part of, or connected with, the interface circuit discussed above, and/or may include or connect with communication devices such as a transmitter, a receiver, a transceiver, a modem and/or network interface card to facilitate exchange of data with external devices via a network, such as network 2074. In an embodiment, security mechanisms may be used to provide secure communications, as would be understood by one of ordinary skill in the art.

Secondary storage device(s) 2182 may store processing logic 2185 (e.g., software) to be executed by processor(s) 2110, and/or may store data 2186. Processing logic 2185 and data 2186 may be used by processor(s) 2110 to facilitate data collection functions and/or communications between devices, determinations/calculations/computations (e.g., if not done at the node device(s) or elsewhere), etc., according to embodiments of this disclosure. Processing logic 2185 may include algorithms/instructions for executing the methodology described herein, such as data communications/messaging, determining and/or evaluation of sensor data, etc., determining one or more actions to take based at least in part on the evaluation, and carrying out the action(s). Examples of secondary storage device(s) 2182 may include one or more hard drive disks, including but not limited to electro-mechanical hard drives, FLASH memory hard drives (SSDs), compact disk (CD) drives, digital versatile disk (DVD) drives, Blu-ray disk drives, redundant array of independent disks (RAID) systems, floppy disk drives, flash drives, etc. Data and/or processing logic may be stored on a removable tangible computer readable storage medium (e.g., a floppy disk, a CD, a DVD, a Blu-ray disk, etc.) using one or more of the secondary storage device(s) 2182.

Figure 22:
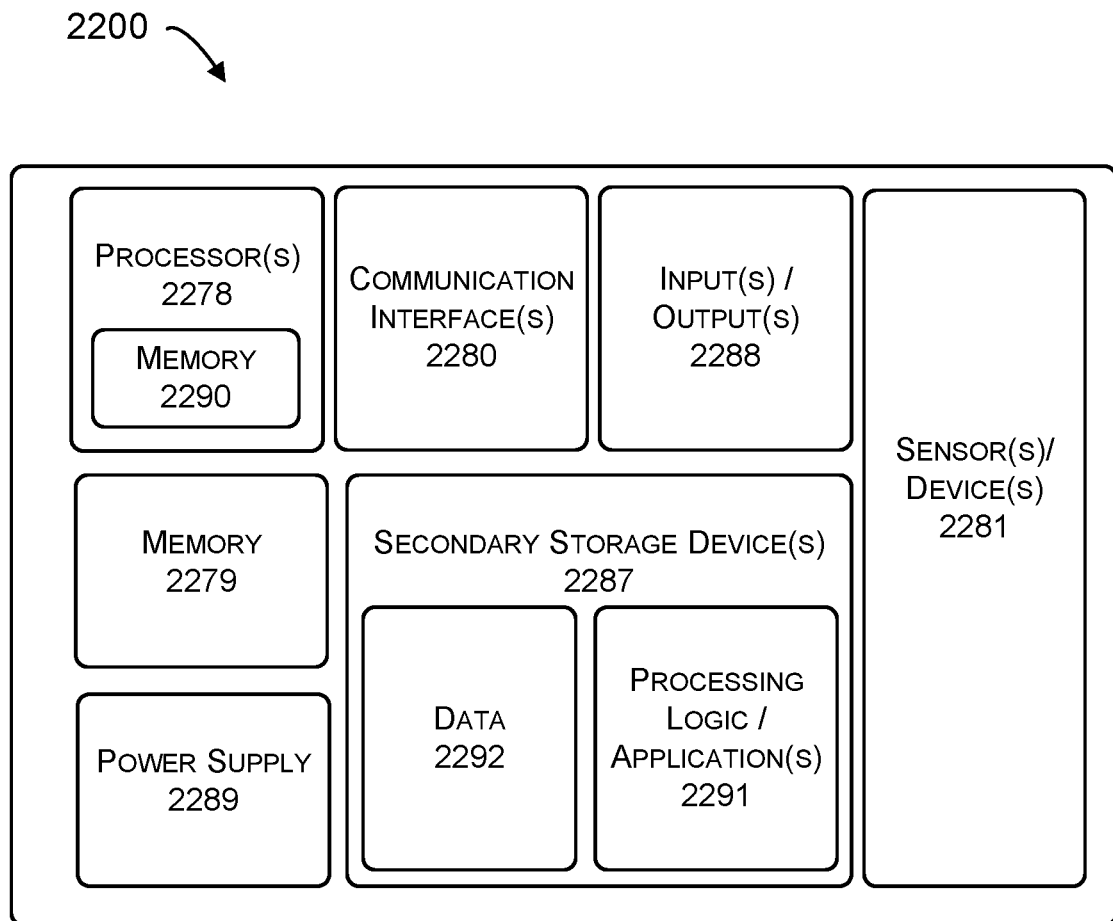
FIG. 22 is a block diagram showing various components of an example network node (e.g., nodes 102 or 104 of FIG. 1 or nodes 2002 of FIG. 20), according to an embodiment of the present disclosure.

FIG. 22 is a block diagram of an example processing platform 2200 of a node device (e.g., nodes 102/104/2002), according to embodiments. Processing platform 2200 may include one or more processors 2278, memory 2279, one or more secondary storage devices 2287, one or more input/output ports or devices 2288, and/or one or more communication interfaces 2280, in communication via a bus, line, or similar implementation (not shown). Processing platform 2200 may also include a power supply 2289, which may include an interface to an electricity source and/or may include one or more batteries. Platform 2200 may also include one or more sensors/devices 2281, which may include, for example, one or more measurement sensors (e.g., temperature sensor(s), tamper-related sensor(s), gyroscope(s), global positioning sensors (GPS), altimeter(s), accelerometer(s), leak detector(s), pressure sensors, pressure drop detector(s), water quality related sensor(s) (e.g., TDS sensor(s), colorimeter(s), conductivity meter(s), pH meter(s), turbidity meter(s), dissolved oxygen meter(s), etc.), backflow sensors, and/or any of the other sensors discussed herein or known/recognized by those of ordinary skill in the relevant arts) and/or other devices (e.g., utility meter(s), actuator(s), light(s), IoT device(s), etc.).

Processor(s) 2278 may be implemented by, for example but not limitation, one or more integrated circuits, ASIC circuits, FPGA circuits, PLC circuits, PLD, circuits, logic circuits, microprocessors, controllers, etc. Processor(s) 2278 may include a local memory 2290 (e.g., a cache), an arithmetic logic unit (ALU), an internal or external bus controller, an internal register file, a floating point unit, a digital signal processor (DSP), an interrupt controller, or a memory management unit (MMU). Memory 2279 may include a volatile and/or a non-volatile memory. Volatile memory may be implemented by Static RAM (SRAM) and/or Dynamic RAM (DRAM) of any type, including but not limited to: Synchronous Dynamic Random Access Memory (SDRAM), Dynamic Random Access Memory (DRAM), and/or any other type of random access memory device. Non-volatile memory may be implemented by flash memory and/or any other desired type of memory device. Access to memory 2279 may be controlled by a memory controller (not shown). Data stored in memory 2279 and/or local memory 2290 may be used by processor(s) 2278 to facilitate data collection functions, determinations/calculations/computations, metering functions and/or metering calculations/computations (if embodied in a utility meter), and/or communications, etc., according to embodiments of this disclosure.

Input/output port(s)/device(s) 2288 may allow a user or an external device to interface with processor(s) 2278. Input devices may allow a user to enter data and/or commands for processor(s) 2278. Input devices may include, for example, an audio sensor, a microphone, a camera (e.g., still, video, etc.), a keyboard, a button, a mouse, a touchscreen, a track-pad, a trackball, isopoint, a voice recognition system, etc. Output devices may provide or present information to a user. Output devices may include, for example, display devices (e.g., a light emitting diode (LED), an organic light emitting diode (OLED), a liquid crystal display, a cathode ray tube display (CRT), a touchscreen, a tactile output device, a printer, speakers, etc.). The input/output port(s)/device(s) 2288 may be connected to processor(s) 2278, for example, with an interface circuit (not shown). The interface circuit may be implemented by any type of interface standard, such as, for example, an Ethernet interface, a universal serial bus (USB), a PCI express interface, etc. For use with an output device, the interface circuit may include a graphics driver card, chip, and/or processor.

Communication interface(s) 2280 may be implemented in hardware or a combination of hardware and software, and may provide wired or wireless network interface(s) to one or more networks, such as network 2074. Communication interface(s) 2280 may be a part of, or connected with, the interface circuit discussed above, and/or may include or connect with communication devices such as a transmitter, a receiver, a transceiver, a modem and/or network interface card to facilitate exchange of data with external devices via a network, such as network 2074. In an embodiment, security mechanisms may be used to provide secure communications, as would be understood by one of ordinary skill in the art.

Secondary storage device(s) 2287 may store processing logic 2291 (e.g., software) to be executed by processor(s) 2278, and/or may store data 2292. Processing logic 2291 and data 2292 may be used by processor(s) 2278 to facilitate sensor data collection functions, metering functions and/or metering calculations/computations if embodied in a utility meter, other determinations/calculations/computations, and/or communications between devices, etc., according to embodiments of this disclosure. Processing logic 2291 may include algorithms/instructions for executing the methodology described herein, such as data communications/messaging, making determinations and/or evaluation of sensor data, etc., determining one or more actions to take based at least in part on the determinations/evaluation(s), and carrying out the action(s). Examples of secondary storage device(s) 2287 may include one or more hard drive disks, including but not limited to electro-mechanical hard drives, FLASH memory hard drives (SSDs), compact disk (CD) drives, digital versatile disk (DVD) drives, Blu-ray disk drives, redundant array of independent disks (RAID) systems, floppy disk drives, flash drives, etc. Data and/or processing logic may be stored on a removable tangible computer readable storage medium (e.g., a floppy disk, a CD, a DVD, a Blu-ray disk, etc.) using one or more of the secondary storage device(s) 2287.

The description herein discloses a system of determining alternative outcomes or events using aggregated data from a plurality of networked nodes in an effective and timely manner. By aggregating and analyzing such data, more meaningful and distinctive conclusions may be drawn than by analyzing each individual piece of data or the data collected from a single node device. Because the collection of data may already be available in existing infrastructure(s) (such as a utility system or other node-based system), this additional capability greatly increases the usefulness and effectiveness of such data, and without the additional cost of implementing a separate system with the described capabilities. Providing these capabilities will allow for a more immediate response for not only potential maintenance needs of such systems, but also for potentially dangerous and/or destructive situations. In addition to immediate (possibly even emergency) response, a service provider (such as a utility service, etc.) can also be promptly informed that associated node devices and other equipment may require servicing or replacement due to potential damage, and technicians may be scheduled in a more timely manner than they would be if this system was not in place.

The particular examples used in this document are for ease of understanding and are not to be limiting. While the examples provided herein involve a small neighborhood for ease of description and understanding, the principles described herein may extend to a much broader area. Further, a person of ordinary skill in the relevant art would also recognize that similar and/or contrasting data reported from areas that are geographically apart could result in the determination of even more meaningful event interpretations. In addition, while the embodiments described herein involve communications from a sensor or node associated with the sensor, some node communications may be more involved, as would be understood by one of ordinary skill in the art. For example, communications to/from utility meters require a significant amount of power. In some implementations, communications to/from, for example, a gas or water meter node (which may run on battery power) may actually be handled via a nearby electricity meter node or other type of node (which may run on direct power and may not need to conserve battery power). Further, although many of the embodiments described herein involve utility meters (e.g., gas meters, water meters, electricity meters, etc.), features described herein may be used in many other contexts that may or may not involve utility meters (e.g., various communication systems, IoT applications, etc., where networked nodes associated with service providers may be able to report various data points provided by the nodes' associated sensors, receive data reports from other nodes, aggregate received data, make determinations, and/or perform actions in response to those determinations). As would be understood by one of ordinary skill in the art, the time-, resource-, property- and even life-saving features discussed herein may be beneficial in many other systems involving sensors and networked communication devices (e.g., industrial manufacturing, mining, agriculture, transportation, etc.), including in fields yet unknown.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A data collection device in communication with one or more nodes over a network, the one or more nodes associated with one or more sensors, the data collection device comprising:
 a processor; and
 a transceiver communicably coupled with the processor, the transceiver configured to receive data communications from the one or more nodes via the network;
 wherein the processor is configured to:
  receive, via the transceiver, a first data communication from a first node of the one or more nodes, the first data communication including a first data value reported from one or more first sensors of the one or more sensors;
  determine a first event condition based at least in part on the first data value being beyond a threshold set for data coming from the one or more sensors;
  receive, via the transceiver, additional data communications from one or more second nodes of the one or more nodes, the additional data communications including additional data values reported from one or more second sensors of the one or more sensors;

aggregate the first data value and the additional data values, to thereby produce aggregated data values;

determine based at least in part on the aggregated data values and a known relationship between the one or more first sensors and the one or more second sensors, that the determination of the first event condition is incorrect;

determine a second event condition, to replace the first event condition, based at least in part on the first data value and the additional data values being beyond the threshold set for data coming from the one or more sensors, to thereby produce a determination of the second event condition; and perform one or more actions in response to the determination of the second event condition.

2. The data collection device of claim 1, wherein the known relationship between the one or more first sensors and the one or more second sensors involves one or more of:

physical locations of the one or more first sensors and the one or more second sensors;

physical proximity to each other of the one or more first sensors and the one or more second sensors;

logical groupings of the one or more first sensors and the one or more second sensors;

zip codes of the physical locations of the one or more first sensors and the one or more second sensors;

service line topology associated with the one or more first sensors and the one or more second sensors;

transformer topology associated with the one or more first sensors and the one or more second sensors; or service capacities at the physical locations of the one or more first sensors and the one or more second sensors.

3. The data collection device of claim 1, wherein:

the one or more sensors include one or more of an accelerometer or a gyroscope associated with one or more utility meters;

the first event condition is one or more of theft or tampering of a first utility meter associated with the one or more first sensors; and the second event condition is an earthquake or explosion.

4. The data collection device of claim 1, wherein:

the one or more sensors include one or more of a leakage detector or a pressure drop detector associated with one or more water meters or gas meters;

the first event condition is one or more of a leak or pressure drop in a gas or water line; and the second event condition is an earthquake or explosion.

5. The data collection device of claim 1, wherein:

the one or more sensors include one or more temperature sensors;

the first event condition is overheating of a component; and the second event condition is a fire.

6. The data collection device of claim 1, wherein:

the one or more sensors include one or more short circuit detectors;

the first event condition is a short circuit; and the second event condition is a flood or a fire.

7. The data collection device of claim 1, wherein:

the one or more nodes include one or more electricity meters;

the first event condition is a power outage at an electricity meter associated with the one or more first sensors; and the second event condition is failure of a transformer that is associated with the one or more first sensors and the one or more second sensors.

8. The data collection device of claim 7, wherein the transformer includes a distribution transformer meter, and wherein the processor is further configured to:

receive meter data from the distribution transformer meter; and determine, based at least in part on the meter data, which winding of the transformer is failing.

9. The data collection device of claim 1, wherein:

the one or more sensors include one or more water quality sensors;

the first event condition is water contamination at a location associated with the one or more first sensors; and the second event condition is a contaminated water supply line associated with the one or more first sensors and the one or more second sensors.

10. The data collection device of claim 9, wherein the processor is further configured to:

receive further data communications from one or more third nodes of the one or more nodes, the further data communications including further data values reported from one or more third sensors of the one or more sensors; and determine, based at least in part on the further data values not being beyond the threshold set for data coming from the one or more sensors, and based at least in part on a known relationship among the one or more first sensors, the one or more second sensors, and the one or more third sensors, an approximate location of the water contamination in the water supply line.

11. The data collection device of claim 9, wherein the processor is further configured to:

receive further data communications including flow rate data from one or more water meter endpoints of a water supply topology associated with the contaminated water supply line; and determine, based at least in part on the flow rate data, that there is water stagnation contributing to the water contamination.

12. The data collection device of claim 9, wherein the processor is further configured to:

receive further data communications including one or more backflow alerts and/or pressure differential alerts from one or more water meter endpoints of a water supply topology associated with the contaminated water supply line; and determine, based at least in part on the received one or more backflow alerts and/or pressure differential alerts, that backflow is contributing to the water contamination.

13. The data collection device of claim 1, wherein the processor is further configured to:

receive further data communications from one or more third nodes of the one or more nodes, the further data communications including further data values reported from one or more third sensors of the one or more sensors; and determine an approximate location of where the second event condition occurred based at least in part on the further data values not being beyond the threshold set for data coming from the one or more sensors, and based at least in part on a known relationship among the one or more first sensors, the one or more second sensors, and the one or more third sensors.

14. The data collection device of claim 1, wherein the processor is further configured to:
receive further data communications from the one or more nodes, the further data communications including further data values reported from one or more third sensors associated with the one or more nodes that measure different data than the one or more first sensors and the one or more second sensors,
wherein the determining of the second event condition includes distinguishing between a first possible event and a second possible event based at least in part on the further data values from the one or more third sensors.

15. The data collection device of claim 1, wherein the data collection device is one of:
a utility meter node associated with a service provider;
a utility meter edge device associated with the service provider;
a remote data collection device located away from a central office of the service provider; or
a computing device located at the central office of the service provider.

16. The data collection device of claim 1, wherein the one or more performed actions include one or more of:
sending a reporting alert reporting the second event condition to an entity that manages the one or more nodes;
sending an emergency alert informing emergency services of the second event condition;
sending a consumer alert informing affected consumers of the second event condition;
sending a disconnection signal to disconnect a service to the affected consumers;
sending a closure signal to close valves of one or more gas or water pipelines; or
sending a shutdown signal to shut down one or more devices associated with the one or more nodes.

17. The data collection device of claim 1, wherein the one or more nodes are associated with utility meters or are located along a utility delivery system.

18. A method of determining an alternative event condition, the method comprising:
receiving, via a transceiver of a data collection device, a first data communication from a first node of one or more nodes in communication with the data collection device over a network, the one or more nodes associated with one or more sensors, the first data communication including a first data value reported from one or more first sensors of the one or more sensors;
determining, by a processor of the data collection device, a first event condition based at least in part on the first data value being beyond a threshold set for data coming from the one or more sensors;
receiving, via the transceiver, additional data communications from one or more second nodes of the one or more nodes, the additional data communications including additional data values reported from one or more second sensors of the one or more sensors;
aggregating, by the processor, the first data value and the additional data values, to thereby produce aggregated data values;
determining, by the processor, based at least in part on the aggregated data values and a known relationship between the one or more first sensors and the one or more second sensors, that the determination of the first event condition is incorrect;
determining, by the processor, a second event condition, to replace the first event condition, based at least in part on the first data value and the additional data values being beyond the threshold set for data coming from the one or more sensors, to thereby produce a determination of the second event condition; and
performing, by the processor, one or more actions in response to the determination of the second event condition.

19. The method of claim 18, wherein:
the one or more nodes include one or more electricity meters;
the first event condition is a power outage at an electricity meter associated with the one or more first sensors;
the second event condition is failure of a transformer that is associated with the one or more first sensors and the one or more second sensors; and
the transformer includes a distribution transformer; and
wherein the method further comprises:
receiving, via the transceiver, meter data from the distribution transformer; and
determining, by the processor, based at least in part on the meter data, which winding of the transformer is failing.

20. The method of claim 18, wherein:
the one or more sensors include one or more water quality sensors;
the first event condition is water contamination at a location associated with the one or more first sensors; and
the second event condition is water contamination in a water supply line associated with the one or more first sensors and the one or more second sensors; and
wherein the method further comprises:
receiving, via the transceiver, further data communications from one or more third nodes of the one or more nodes, the further data communications including further data values reported from one or more third sensors of the one or more sensors; and
determining, by the processor, based at least in part on the further data values not being beyond the threshold set for data coming from the one or more sensors, and based at least in part on a known relationship among the one or more first sensors, the one or more second sensors, and the one or more third sensors, an approximate location of the water contamination in the water supply line.

21. The method of claim 18, wherein:
the one or more sensors include one or more water quality sensors;
the first event condition is water contamination at a location associated with the one or more first sensors; and
the second event condition is a contaminated water supply line associated with the one or more first sensors and the one or more second sensors; and
wherein the method further comprises:
receiving, via the transceiver, further data communications including flow rate data from one or more water meter endpoints of a water supply topology associated with the contaminated water supply line; and
determining, by the processor, based at least in part on the flow rate data, that there is water stagnation contributing to the water contamination.

22. The method of claim 18, wherein:
the one or more sensors include one or more water quality sensors;

the first event condition is water contamination at a location associated with the one or more first sensors; and the second event condition is a contaminated water supply line associated with the one or more first sensors and the one or more second sensors; and wherein the method further comprises:

receiving further data communications including one or more backflow alerts or pressure differential alerts from one or more water meter endpoints of a water supply topology associated with the contaminated water supply line; and determining, based at least in part on the received one or more backflow alerts or pressure differential alerts, that backflow is contributing to the water contamination.

23. The method of claim 18, further comprising:

receiving, via the transceiver, further data communications from one or more third nodes of the one or more nodes, the further data communications including further data values reported from one or more third sensors of the one or more sensors; and determining, by the processor, an approximate location of where the second event condition occurred based at least in part on the further data values not being beyond the threshold set for data coming from the one or more sensors, and based at least in part on a known relationship among the one or more first sensors, the one or more second sensors, and the one or more third sensors.

24. The method of claim 18, further comprising:

receiving, via the transceiver, further data communications from the one or more nodes, the further data communications including further data values reported from one or more third sensors associated with the one or more nodes that measure different data than the one or more first sensors and the one or more second sensors, wherein the determining of the second event condition includes distinguishing between a first possible event and a second possible event based at least in part on the further data values from the one or more third sensors.

25. The method of claim 18, wherein the performing the one or more actions in response to the determination of the second event condition includes one or more of:

sending a reporting alert reporting the second event condition to an entity that manages the one or more nodes;

sending an emergency alert informing emergency services of the second event condition;

sending a consumer alert informing affected consumers of the second event condition;

sending a disconnection signal to disconnect a service to the affected consumers;

sending a closure signal to close valves of one or more gas or water pipelines; or sending a shutdown signal to shut down one or more devices associated with the one or more nodes.

26. A non-transitory computer-readable medium having computer program logic stored thereon, the computer program logic including instructions to cause the processor of the data collection device to perform the method of claim 18.

* * * * *